United States Patent [19]
Komatsu et al.

[11] Patent Number: 5,989,758
[45] Date of Patent: Nov. 23, 1999

[54] LIQUID CRYSTALLINE POLYESTERS, THEIR COMPOSITION, AND THEIR USES

[75] Inventors: Shinichi Komatsu, Kawasaki; Suzushi Nishimura, Yokohama; Akira Takagi, Kawasaki; Shinichiro Suzuki, Yokohama, all of Japan

[73] Assignee: Nippon Oil Company, Limited, Tokyo, Japan

[21] Appl. No.: 09/163,694

[22] Filed: Sep. 30, 1998

[30] Foreign Application Priority Data

| Sep. 30, 1997 | [JP] | Japan | 9-265810 |
| Oct. 23, 1997 | [JP] | Japan | 9-290848 |
| Feb. 27, 1998 | [JP] | Japan | 10-046454 |
| Mar. 5, 1998 | [JP] | Japan | 10-053132 |

[51] Int. Cl.$^6$ .......... C08K 19/00; C08G 63/02; C08F 20/00

[52] U.S. Cl. .......... 430/20; 528/176; 528/190; 528/191; 528/192; 528/193; 528/194; 528/272; 528/298; 528/302; 528/306; 528/308; 525/437; 525/444; 430/627; 430/631; 428/1; 428/64.1; 428/357

[58] Field of Search .......... 528/176, 190, 528/191, 192, 193, 194, 272, 298, 302, 306, 308; 525/437, 444; 430/20, 627, 631; 428/1, 64.1, 357

[56] References Cited

U.S. PATENT DOCUMENTS

| 5,246,747 | 9/1993 | Gillberg-Laforce et al. | 428/1 |
| 5,438,421 | 8/1995 | Sugawara et al. | 359/75 |
| 5,583,672 | 12/1996 | Kim | 349/92 |
| 5,648,860 | 7/1997 | Ooi et al. | 349/10 |
| 5,783,120 | 7/1998 | Ouderkirk et al. | 264/1.34 |
| 5,825,543 | 10/1998 | Ouderkirk et al. | 359/494 |

*Primary Examiner*—Samuel A. Acquah
*Attorney, Agent, or Firm*—Scully, Scott, Murphy & Presser

[57] ABSTRACT

There are provided liquid crystalline polyesters comprising 4'-hydroxy-4-stilbenecarboxylic acid type units, dicarboxylic acid units acting as a mesogen such as 4,4'-stilbenecarboxylic acid and catechol units as essential ingredients, and a liquid crystalline polyester composition comprising said polyesters and optically active liquid crystalline polyesters consisting essentially of 4,4'-stilbenedicarboxylic acid type units and aliphatic diol units having asymmetric carbons.

8 Claims, 11 Drawing Sheets

Ex. 1
(400 MHz DMSO-db)

Ex. 14

Ex. 7

Syn. Ex. 1
(CDCl₃ 270MHz)

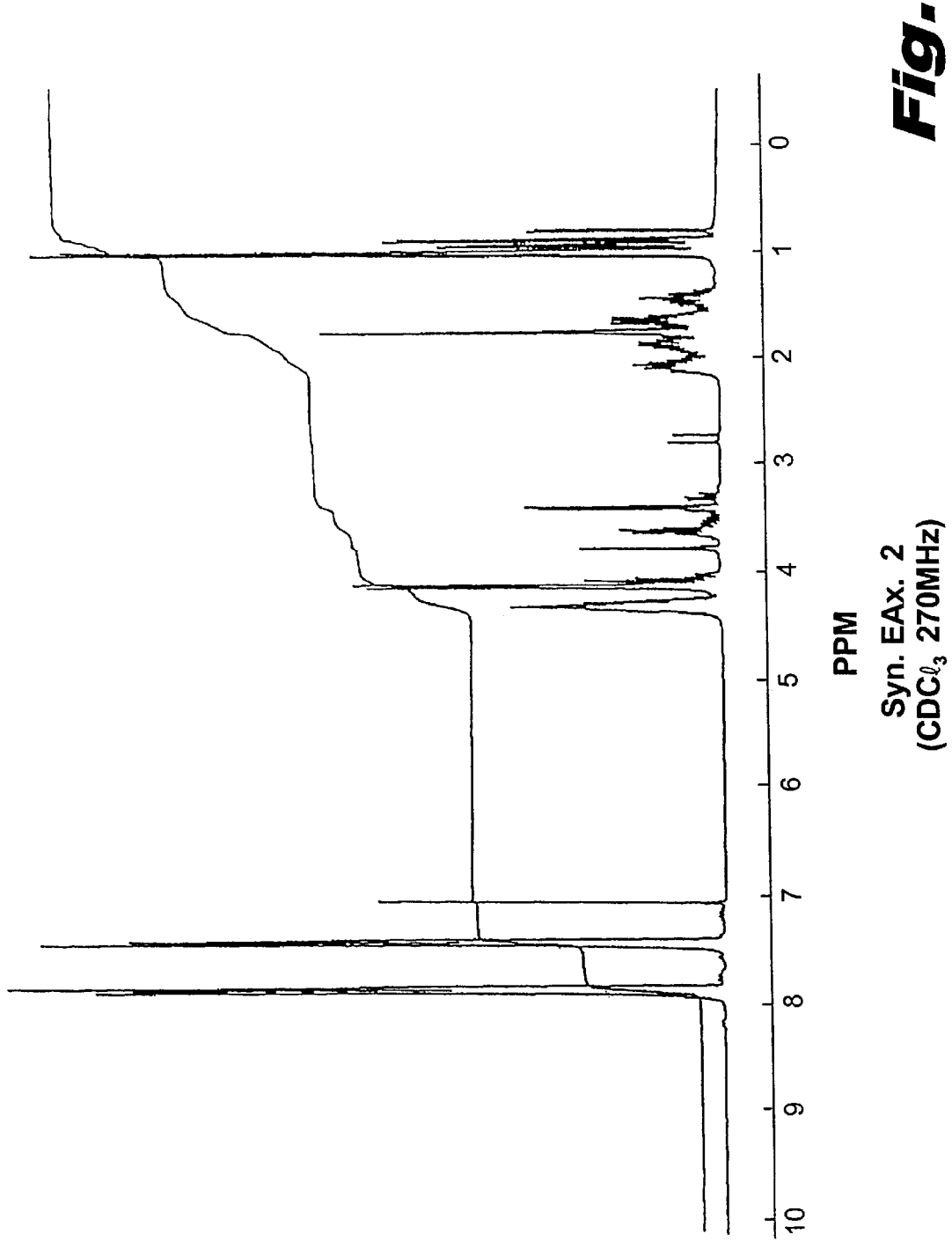

LIQUID CRYSTALLINE POLYESTERS, THEIR COMPOSITION, AND THEIR USES

FIELD OF THE INVENTION

The present invention relates to novel liquid crystalline polyesters and their composition as well as novel optical films consisting of the same which have a high double refractive index, has a broad zone width of a cholesteric selective reflection wavelength spectrum and is suitable for application to the field of optoelectronics.

BACKGROUND OF THE INVENTION

It is known that liquid crystals have an order of unique molecular orientation depending on their type. Accordingly, liquid crystals are utilized in various fields by utilizing and controlling said molecular orientation, and forms an industrially large field.

With respect to monomeric liquid crystals, those of the nematic type are used widely as display elements in watches, calculators or TV, as is well-known. In the field of display, they have established a firm position. As described above, the majority of the application of monomer liquid crystals is based on electric optical effects.

With respect to polymeric liquid crystals, not only their physical characteristics but also their electric optical effects or thermal optical effects similar to those of monomeric liquid crystals are well-known to be exhibited depending on the respective nematic, smectic and cholesteric liquid crystal types. The response of polymeric liquid crystals to external force such as electric field, heat etc. is slower than that of monomeric liquid crystals, so they cannot be used for the same uses as monomeric liquid crystals. However, polymeric liquid crystals have the major characteristics that orientation structures unique to the respective liquid crystal types can be fixed. Polymeric liquid crystals having an orientation structure unique to the liquid crystals fixed depending on the type of the liquid crystals are used as indicator materials, recording materials etc. The polymeric liquid crystals can be formed into films or thin films advantageous as optical materials, and the polymeric liquid crystals formed into films or thin films can be applied in various fields.

The physical values characteristic of liquid crystals regardless of whether they are monomeric or polymeric include double refractive index ($\Delta n$). The $\Delta n$ values of monomeric nematic liquid crystals depends on molecular structures, and tran type (<0.28), azo, azoxy type (0.25 to 0.30), Schiff base type (<0.24) and pyrimidine type (<0.23) show relatively high $\Delta n$ values. Cyclohexylcyclohexane type (<0.06), cyclohexylcarboxylic acid ester type (<0.1), and phenylcyclohexane type (0.08 to 0.19) show low $\Delta n$ values. The $\Delta n$ value is one of important parameters in the field of electronic display, and development of high-performance is made feasible by the characteristics of said physical value. For example, the $\Delta n$ of monomeric nematic liquid crystals is raised to reduce the thickness of cells in display devices and to improve response rates. In dual-STN, a raise in the $\Delta n$ of liquid crystals is desired to improve display contrast. Although the $\Delta n$ value is an important parameter as described above in the field of electronic display, the $\Delta n$ values of nematic liquid crystals are usually in the range of about 0.1 to 0.3 so that their further application to electronic displays are limited.

To increase the $\Delta n$ value, it is necessary to raise said value by specific molecular structures. It is known that the $\Delta n$ value depends on the molecular polarizability and the parameter of orientation order and can thus be improved by compounds with high polarizability generating anisotropy optically or by conjugate compounds with high electron density, such as benzene rings, polycyclic aromatic groups, ethylene-acetylene chain groups, terminal cyano groups etc. On the basis of this, M. Hird et al. have reported monomeric liquid crystals with $\Delta n$ of less than 0.43 consisting of polycyclic aromatic tran type liquid crystals with high polarizablility (M. Hird et al., Liquid Crystals, 15, 123 (1993)).

However, polymeric liquid crystals with $\Delta n$ values exceeding 0.3 are usually not present and there is only one report where $\Delta n$ was raised to 0.865 by mechanically drawing aromatic polyamides (H. G. Rogers et al., Macromolecules, 18, 1058 (1985)).

For application of polymeric liquid crystals to recording mediums, memory elements etc. in the field of optoelectronics, it is evidently necessary to develop polymeric liquid crystals showing both self-orientation over glass transition temperature (Tg) and self-memorization below Tg, but there is no report on such liquid crystal polymers either.

As described above, development of polymeric liquid crystals having high $\Delta n$ values due to the self-orientation of the liquid crystals themselves is essential for development for new use and application of polymeric liquid crystals. Further essential requirements for said polymeric liquid crystals are that they are excellent in the orientation ability and fixation ability and are easily formed into films and thin films, and there has been demand for development of such polymeric liquid crystals.

OBJECT OF THE INVENTION

The object of the present invention is to solve the above problem. As a result of their eager study to solve the above problem, the present inventors developed new liquid crystalline polyesters exhibiting a liquid crystalline phase at the time of fusion and being capable of fixing said liquid crystalline phase upon cooling below the liquid crystalline transition temperature, so that the above problem was solved.

SUMMARY OF THE INVENTION

The present inventors have invented liquid crystalline polyesters having specific monomer units with high polarizablility in a conjugated system elongating in the direction of the main chain, and catechol units, in main-chain type liquid crystalline polyesters and they have invented new optical films by use of said polyesters.

That is, the present first invention relates to liquid crystalline polyesters having the following structural units (A), (B) and (C) as essential structural units and at least one structural unit selected from the structural units (D), (E) and (F) as arbitrary structural units and having a logarithmic viscosity of 0.05 to 0.5 determined at a concentration of 0.5 g/dl at a temperature of 30° C. in a mixed solvent of phenol/tetrachloroethane (ratio of 60/40 by weight). 20 to 80 mol % Compound (A):

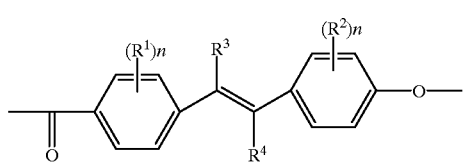
(A)

wherein R¹ and R² independently represent H, F, Cl, Br or C1 to C5 alkyl groups or alkoxy groups; R³ or R⁴ represent H, F, Cl, Br or C1 to C5 alkyl groups; and n is 1 or 2. 10 to 40 mol % Compound (B):

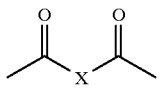
(B)

wherein X is at least one structural unit selected from the group consisting of:

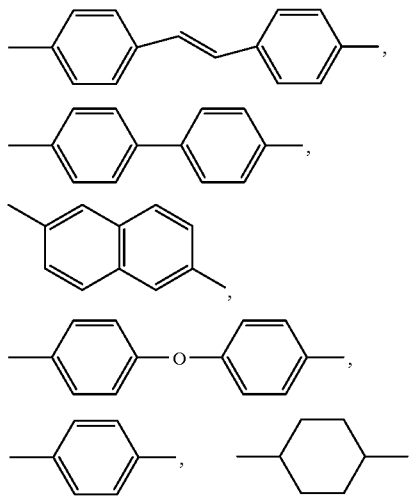

and

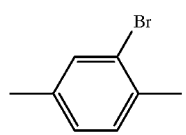

10 to 40 mol % Compound (C):

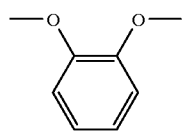
(C)

0 to 10 mol % Compound (D):

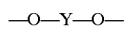 (D)

wherein Y is at least one structural unit selected from the group consisting of:

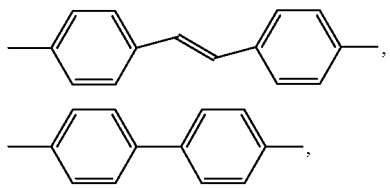

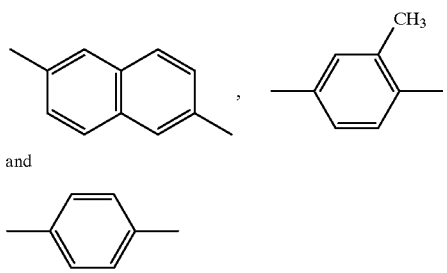

and

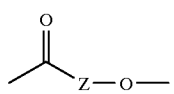

0 to 20 mol % Compound (E):

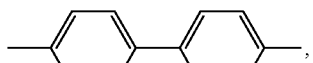
(E)

wherein Z is at least one structural unit selected from the group consisting of:

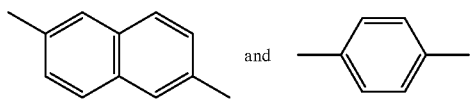

0 to 30 mol % Component (F):

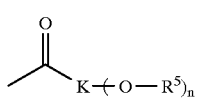
(F)

wherein $R^5$ represents $C_1$ to $C_{20}$ straight-chain or branched chain alkyl groups; n is 1 or 2; and K is at least one structural unit selected from the group consisting of:

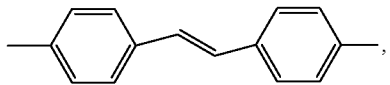

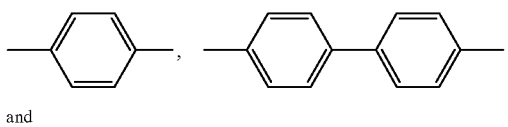

and

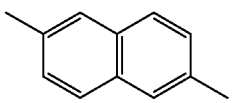

The present second invention is liquid crystalline polyesters according to item 1 above which exhibit a liquid crystalline phase at the time of fusion and can fix said liquid crystalline phase by cooling below the liquid crystal transition temperature.

The phrase "can fix said liquid crystalline phase by cooling below the liquid crystal transition temperature" in the present second invention means that transition of the phase into a crystalline phase does substantially not occur when said liquid crystalline polyesters in a liquid crystalline state is cooled at an arbitrary cooling rate, while the state of the molecular orientation in a liquid crystalline state can be maintained as such below at the liquid crystalline transition temperature (glass transition temperature). The phrase "transition of the phase into a crystalline phase does substantially not occur" means that the occurrence of a crystalline phase cannot be recognized by at least optical measurement means.

The present third invention is a liquid crystalline polyester composition comprising 50 to 99.5 weight-% liquid crystalline polyesters (component I) of the present first invention and 0.5 to 50 weight-% optically active liquid crystalline polyesters i.e. the following component II.

[Component II]

Optically active liquid crystalline polyesters consisting of the following structural units (G) and (H) and having a logarithmic viscosity of 0.05 to 0.5 determined at a concentration of 0.5 g/dl at a temperature of 30° C. in a mixed solvent of phenol/tetrachloroethane (ratio of 60/40 by weight). 30 to 60 mol % Compound (G):

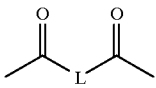

(G)

wherein L is at least one structural unit selected from the group consisting of:

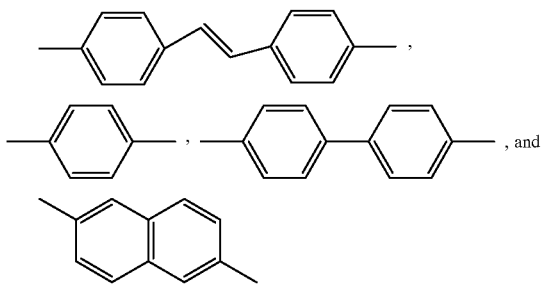

40 to 70 mol % Compound (H):

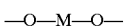

wherein M represents a C3 to C12 optically active divalent aliphatic group containing at least one asymmetric carbon.

The present fourth invention is optical films formed from the liquid crystalline polyesters described in items 1 to 4 above or a composition thereof.

The liquid crystalline polyesters (component I) of the present invention are liquid crystalline polyesters having the structural units (A), (B) and (C) as essential structural units and having at least one structural unit arbitrarily selected from the structural units (D), (E) and (F).

The structural unit (A) is at least one structural unit derived from those with 4'-hydroxy-4-stilbenecarboxylic acid as a fundamental skeleton, such as alkyl-substituted derivatives, alkoxy-substituted derivatives, halogen-substituted derivatives, α-alkyl-substituted derivatives, α,α-dialkyl-substituted derivatives, or functional derivatives of said carboxylic acid. Here, various substituted derivatives of said carboxylic acid include 4'-hydroxy-2'-methoxy-4-stilbenecarboxylic acid, 4'-hydroxy-3'-methoxy-4-stilbenecarboxylic acid, 4'-hydroxy-2',3'-dimethoxy-4-stilbenecarboxylic acid, 4'-hydroxy-2',5'-dimethoxy-4-stilbenecarboxylic acid, 4'-hydroxy-2',6'-dimethoxy-4-stilbenecarboxylic acid, 4'-hydroxy-2'-ethoxy-4-stilbenecarboxylic acid, 4'-hydroxy-3'-ethoxy-4-stilbenecarboxylic acid, 4'-hydroxy-2',3'-diethoxy-4-stilbenecarboxylic acid, 4'-hydroxy-2',5'-diethoxy-4-stilbenecarboxylic acid, 4'-hydroxy-2',6'-diethoxy-4-stilbenecarboxylic acid, 4'-hydroxy-2'-methoxy-3'-ethoxy-4-stilbenecarboxylic acid, 4'-hydroxy-2'-methoxy-5'-ethoxy-4-stilbenecarboxylic acid, 4'-hydroxy-2'-methoxy-6'-ethoxy-4-stilbenecarboxylic acid, 4'-hydroxy-3'-methoxy-2'-ethoxy-4-stilbenecarboxylic acid, 4'-hydroxy-3'-methoxy-5'-ethoxy-4-stilbenecarboxylic acid, 4'-hydroxy-3'-methoxy-6'-ethoxy-4-stilbenecarboxylic acid, 4'-hydroxy-3',5'-dimethoxy-4-stilbenecarboxylic acid, 4'-hydroxy-3',5'-diethoxy-4-stilbenecarboxylic acid, 4'-hydroxy-3-methoxy-4-stilbenecarboxylic acid, 4'-hydroxy-3-ethoxy-4-stilbenecarboxylic acid, 4'-hydroxy-3'-methyl-4-stilbenecarboxylic acid, 4'-hydroxy-3'-ethyl-4-stilbenecarboxylic acid, 4'-hydroxy-3',5'-dimethyl-4-stilbenecarboxylic acid, 4'-hydroxy-3',5'-diethyl-4-stilbenecarboxylic acid, 4'-hydroxy-2'-fluoro-4-stilbenecarboxylic acid, 4'-hydroxy-2'-chloro-4-stilbenecarboxylic acid, 4'-hydroxy-3'-chloro-4-stilbenecarboxylic acid, 4'-hydroxy-2'-bromo-4-stilbenecarboxylic acid, 4'-hydroxy-3',5'-difluoro-4-stilbenecarboxylic acid, 4'-hydroxy-3',5'-dichloro-4-stilbenecarboxylic acid, 4'-hydroxy-3',5'-dibromo-4-stilbenecarboxylic acid, α-methyl-4'-hydroxy-4-stilbenecarboxylic acid, α-methyl-4'-hydroxy-3'-methoxy-4-stilbenecarboxylic acid, α-ethyl-4'-hydroxy-4-stilbenecarboxylic acid, α-ethyl-4'-hydroxy-3'-methoxy-4-stilbenecarboxylic acid, α,α'-dimethyl-4'-hydroxy-4-stilbenecarboxylic acid, α,α'-diethyl-4'-hydroxy-4-stilbenecarboxylic acid etc.

As the hydroxycarboxylic acid unit being other than, and expressing the same function as, the structural unit (A), the structural unit (E) can as necessary contain an unit derived from 4-(4'-hydroxyphenyl)benzoic acid, 6-hydroxy-2-naphthalenecarboxylic acid, 4-hydroxybenzoic acid or functional derivatives thereof (e.g. acetoxy compounds, alkyl esters such as methyl ester etc.). The structural unit (A) is present in the range of usually 20 to 80 mol %, preferably 25 to 75 mol %, more preferably 30 to 70 mol % in the liquid crystalline polyesters. Further, if the structural unit (E) is contained, the percentage composition (molar ratio) of the structural units (A) and (E) is usually in the range of 1/19 to 79/1, preferably 10/20 to 69/1 in terms of (A)/(E), and the structural unit (A) is preferably contained in an amount of at least 20 mol % in said polyesters.

The structural unit (B) is a component acting as a mesogen for expressing liquid crystallinity, and specifically it is at least one structural unit derived from 4,4'-stilbenedicarboxylic acid, 4,4'-biphenyldicarboxylic acid, 2,6-naphthalenedicarboxylic acid, 4,4'-dicarboxydiphenyl ether, terephthalic acid, bromoterephthalic acid or functional derivatives of these dicarboxylic acids (e.g. dialkyl esters such as dimethyl ester etc. and acid chlorides such as dichloride etc.). As an unit being other than, and having the same function as, the structural unit (B), a monofunctional carboxylic acid unit, specifically the structural unit (F) can include as necessary an unit derived from 4'-alkoxy-4-stilbenecarboxylic acid, 3',4'-dialkoxy-4-stilbenecarboxylic acid, 4-(4'-alkoxyphenyl)benzoic acid, 4-(3',4'-dialkoxyphenyl)benzoic acid, 6-alkoxy-2-naphthalenecarboxylic acid, 4-alkoxybenzoic acid, 3,4-dialkoxybenzoic acid or functional derivatives thereof (for example alkyl esters such as methyl ester etc. and acid chlorides such as chlorides). Here, the alkoxy group as the substituent group on said monofunctional carboxylic acid is a C1 to C20 straight-chain or branched chain unit, specifically methoxy, ethoxy, n-propoxy, n-butoxy, n-pentyloxy, n-hexyloxy, n-heptyloxy, n-octyloxy, n-nonyloxy, n-decyloxy, n-octadecyloxy, 2-ethylhexyloxy, i-propoxyoxy etc. The structural unit (B) is present in an amount of usually 10 to 40 mol %, preferably 15 to 35 mol %, more preferably 20 to 35 mol % in the liquid crystalline polyesters. Further, if the structural unit (F) is contained, the percentage composition (molar ratio) of the structural units (B) and (F) is determined usually in the range of 1/9 to 39/1, preferably 5/10 to 34/1 in terms of (B)/2(F), but the structural unit (B) is preferably contained in an amount of at least 10 mol % in said polyesters.

The structural unit (C) is a component playing the role of fixing a liquid crystalline phase under cooling, and specifically it is at least one structural unit derived from catechol or functional derivatives of catechol (e.g. derivatives such as diacetoxy compounds). As the diol unit being other than, and expressing the same function as, the structural unit (C), the structural unit (D) can as necessary include an unit derived from 4,4'-dihydroxystilbene, 4,4'-biphenol, 2,6-dihydroxynaphthalene, hydroquinone, methylhydroquinone or functional derivative thereof (e.g. derivatives such as diacetoxy compounds). The structural unit (C) is present in the range of usually 10 to 40 mol %, preferably 15 to 35 mol %, more preferably 20 to 35 mol % in the liquid crystalline polyesters. Further, if the structural unit (D) is contained, the percentage composition (molar ratio) of the structural units (C) and (D) is usually in the range of 1/9 to 39/1, preferably 5/10 to 34/1 in terms of (C)/(D), but the structural unit (C) is preferably contained in an amount of at least 10 mol % in said polyesters.

In cases where the structural units (B), (C), or as necessary, structural unit (D) is contained, the percentage composition (molar ratio) of (B)/(C) or (B)+2(F)/(C)+(D) is approximately 1 and is in the range of usually 45/55 to 55/45, preferably 48/52 to 52/48.

Specific examples of the liquid polyesters of the present invention can be exemplified as follows:

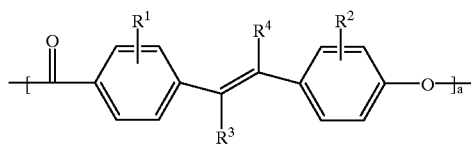

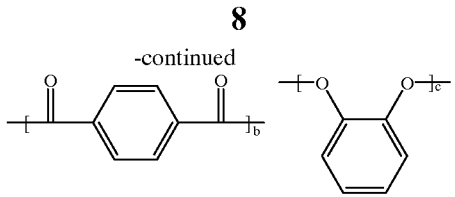

$R^1$, $R^2$: H, F, Cl, Br, $CH_3$, $C_2H_5$, $OCH_3$, $OC_2H_5$
$R^3$, $R^4$: H, F, Cl, Br, $CH_3$, $C_2H_5$
a: 20 to 80 mol %, preferably 30 to 70 mol %
b or c: 10 to 40 mol %, preferably 15 to 35 mol %

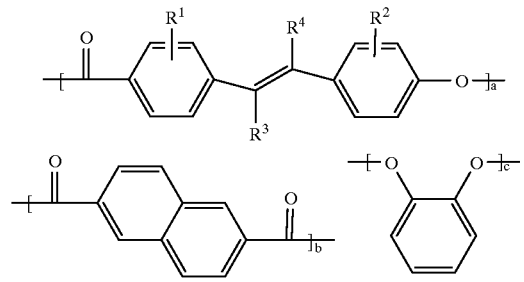

$R^1$, $R^2$: H, F, Cl, Br, $CH_3$, $C_2H_5$, $OCH_3$, $OC_2H_5$
$R^3$, $R^4$: H, F, Cl, Br, $CH_3$, $C_2H_5$
a: 20 to 80 mol %, preferably 30 to 70 mol %
b or c: 10 to 40 mol %, preferably 15 to 35 mol %

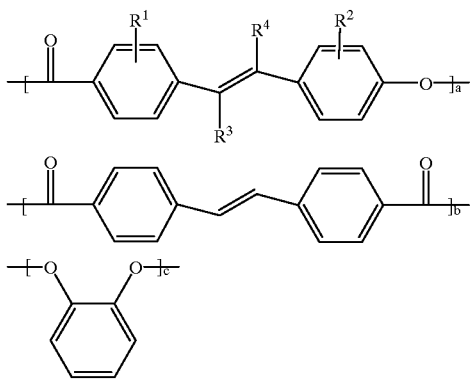

$R^1$, $R^2$: H, F, Cl, Br, $CH_3$, $C_2H_5$, $OCH_3$, $OC_2H_5$
$R^3$, $R^4$: H, F, Cl, Br, $CH_3$, $C_2H_5$
a: 20 to 80 mol %, preferably 30 to 70 mol %
b or c: 10 to 40 mol %, preferably 15 to 35 mol %

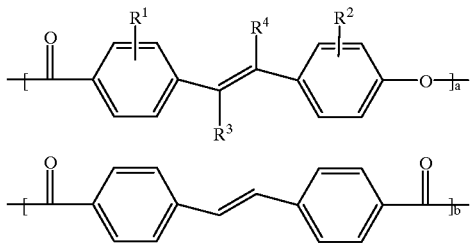

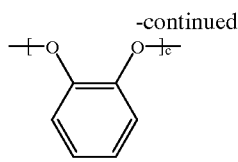

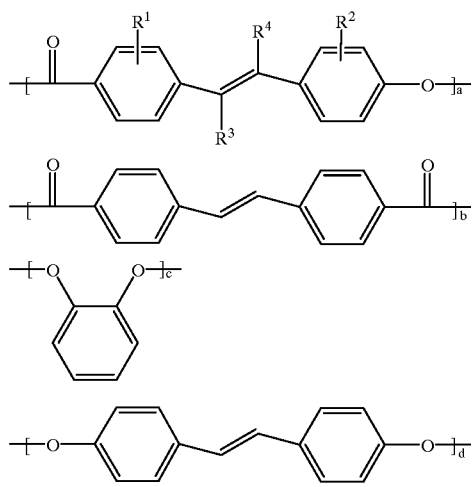

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
a: 20 to 80 mol %, preferably 30 to 70 mol %
b or c: 10 to 40 mol %, preferably 15 to 35 mol %

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
a: 20 to 80 mol %, preferably 30 to 70 mol %
b or c+d: 10 to 40 mol %, c/d=1/9 to 39/1, preferably b or c+d: 15 to 35 mol %
c/d=5/10 to 34/1

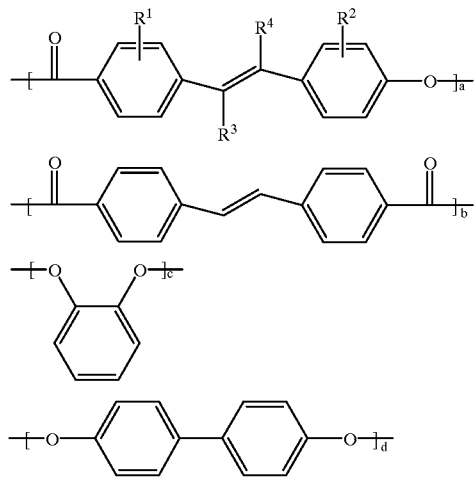

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$ a: 20 to 80 mol %, preferably 30 to 70 mol %
b or c+d: 10 to 40 mol %, c/d=1/9 to 39/1, preferably b or c+d: 15 to 35 mol %
c/d=5/10 to 34/1

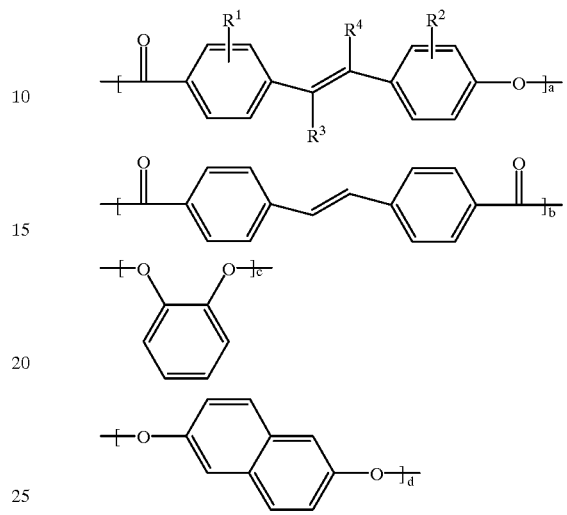

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
a: 20 to 80 mol %, preferably 30 to 70 mol %
b or c+d: 10 to 40 mol %, c/d=1/9 to 39/1, preferably b or c+d: 15 to 35 mol %
c/d=5/10 to 34/1

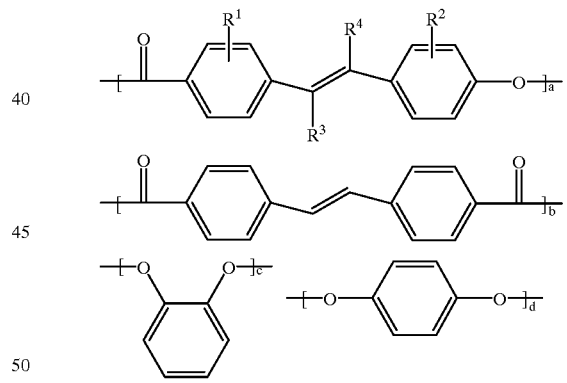

R$^1$, R$^2$: H, F, Cl, Br, CH$_3$, C$_2$H$_5$, OC$_3$, OC$_2$H$_5$
R$^3$, R$^4$: H, F, Cl, Br, CH$_3$, C$_2$H$_5$
a: 20 to 80 mol %, preferably 30 to 70 mol %
b or c+d: 10 to 40 mol %, c/d=1/9 to 39/1, preferably b or c+d: 15 to 35 mol %
c/d=5/10 to 34/1

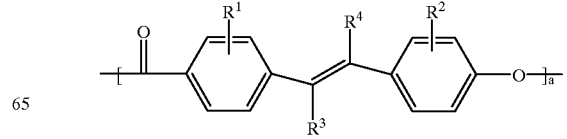

-continued

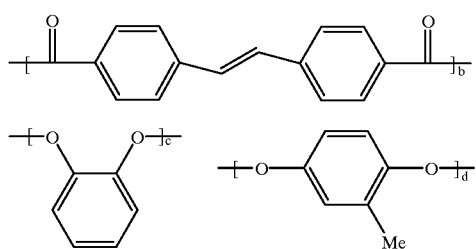

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
a: 20 to 80 mol %, preferably 30 to 70 mol %
b or c+d: 10 to 40 mol %, c/d=1/9 to 39/1, preferably b or c+d: 15 to 35 mol %
c/d=5/10 to 34/1

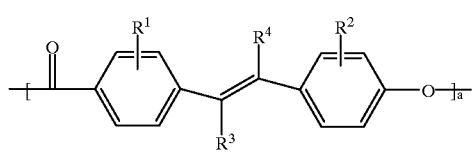

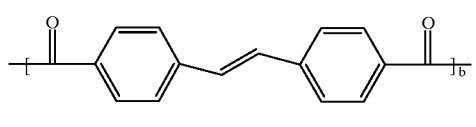

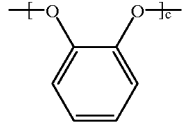

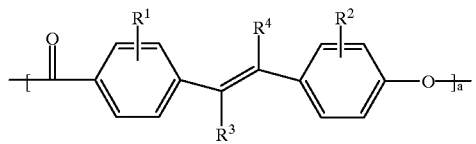

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
a+d: 20 to 80 mol %, a/d=1/19 to 79/1, preferably a+d: 30 to 70 mol %, a/d=10/20 to 69/1
b or c: 10 to 40 mol %, preferably b or c: 15 to 35 mol %

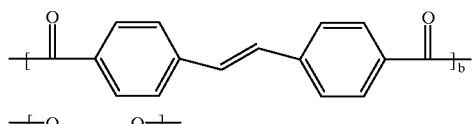

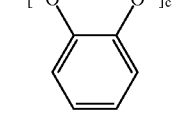

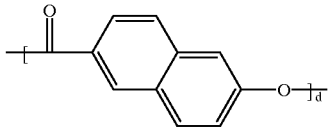

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
a+d: 20 to 80 mol %, a/d=1/19 to 79/1, preferably a+d: 30 to 70 mol %, a/d=10/20 to 69/1
b or c: 10 to 40 mol %, preferably b or c: 15 to 35 mol %

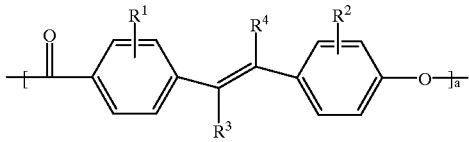

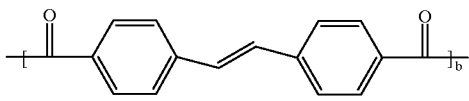

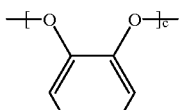

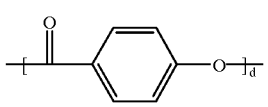

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
a+d: 20 to 80 mol %, a/d=1/19 to 79/1, preferably a+d: 30 to 70 mol %, a/d=10/20 to 69/1
b or c: 10 to 40 mol %, preferably b or c: 15 to 35 mol %

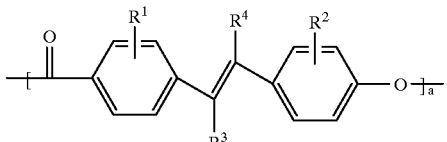

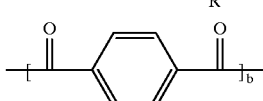

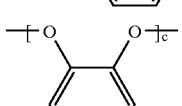

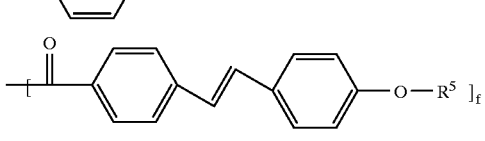

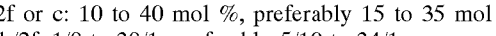

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
R$^5$: CH$_3$ to C$_{20}$H$_{41}$
a: 20 to 80 mol %, preferably 30 to 70 mol %
b/2f or c: 10 to 40 mol %, preferably 15 to 35 mol %, b/2f=1/9 to 39/1, preferably 5/10 to 34/1

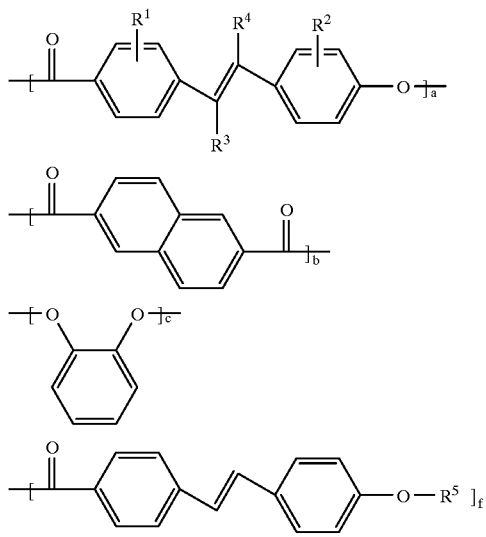

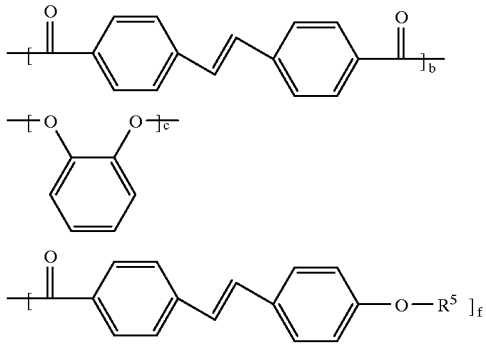

R¹, R²: H, F, Cl, Br, $CH_3$, $C_2H_5$, $OCH_3$, $OC_2H_5$
R³, R⁴: H, F, Cl, Br, $CH_3$, $C_2H_5$
R⁵: $CH_3$ to $C_{20}H_{41}$
a: 20 to 80 mol %, preferably 30 to 70 mol %
b+f/2 or c: 10 to 40 mol %, preferably 15 to 35 mol %
b/2f=1/9 to 39/1, preferably 5/10 to 34/1

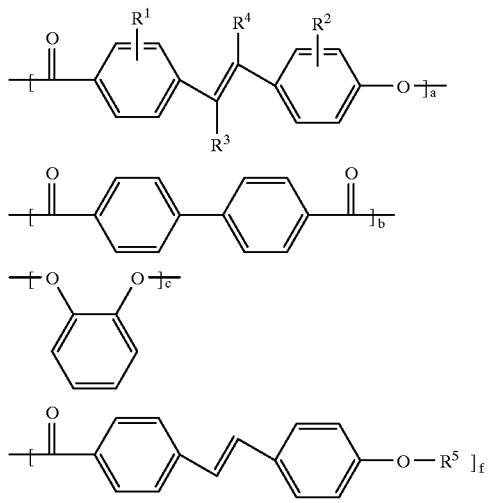

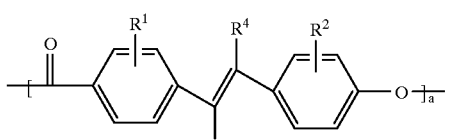

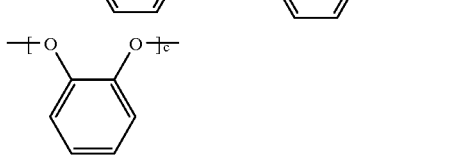

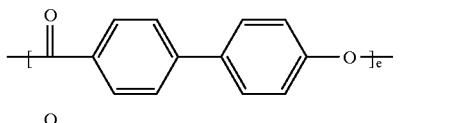

R¹, R²: H, F, Cl, Br, $CH_3$, $C_2H_5$, $OCH_3$, $OC_2H_5$
R³, R⁴: H, F, Cl, Br, $CH_3$, $C_2H_5$
R⁵: $CH_3$ to $C_{20}H_{41}$
a: 20 to 80 mol %, preferably 30 to 70 mol %
b+f/2 or c: 10 to 40 mol %, preferably 15 to 35 mol %
b/2f=1/9 to 39/1, preferably 5/10 to 34/1

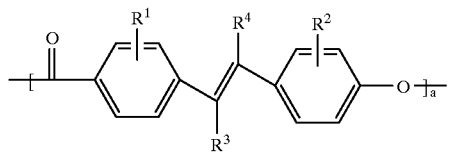

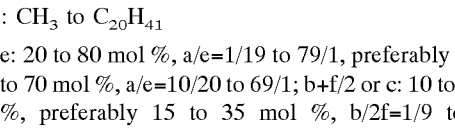

R¹, R²: H, F, Cl, Br, $CH_3$, $C_2H_5$, $OCH_3$, $OC_2H_5$
R³, R⁴: H, F, Cl, Br, $CH_3$, $C_2H_5$
R⁵: $CH_3$ to $C_{20}H_{41}$
a+e: 20 to 80 mol %, a/e=1/19 to 79/1, preferably a+e: 30 to 70 mol %, a/e=10/20 to 69/1; b+f/2 or c: 10 to 40 mol %, preferably 15 to 35 mol %, b/2f=1/9 to 39/1, preferably 5/10 to 34/1

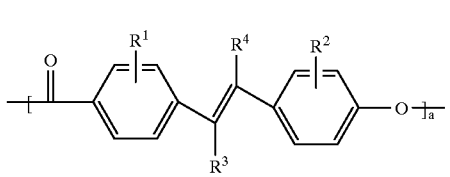

-continued

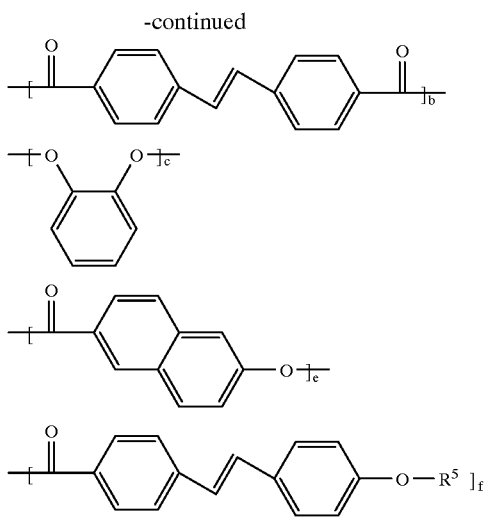

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
R$^5$: CH$_3$ to C$_{20}$H$_{41}$
a+e: 20 to 80 mol %, a/e=1/19 to 79/1, preferably a+e: 30 to 70 mol %, a/e=10/20 to 69/1; b+f/2 or c: 10 to 40 mol %, preferably 15 to 35 mol %, b/2f=1/9 to 39/1, preferably 5/10 to 34/1

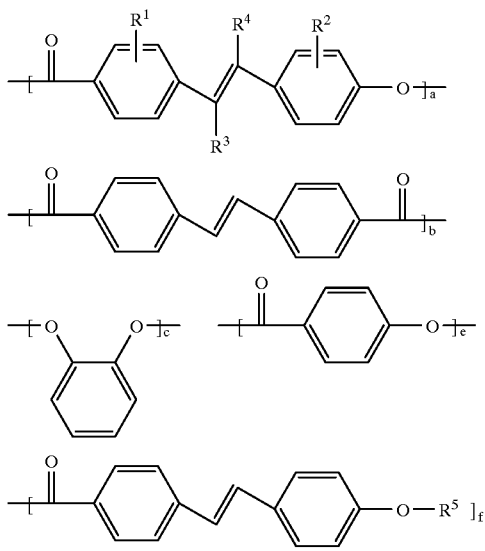

R$^1$, R$^2$: H, F, Cl, Br, CH$_3$, C$_2$H$_5$, OCH$_3$, OC$_2$H$_5$
R$^3$, R$^4$: H, F, Cl, Br, CH$_3$, C$_2$H$_5$
R$^5$: CH$_3$ to C$_{20}$H$_{41}$
a+e: 20 to 80 mol %, a/e=1/19 to 79/1, preferably a+e: 30 to 70 mol %, a/e=10/20 to 69/1; b+f/2 or c: 10 to 40 mol %, preferably 15 to 35 mol %, b/2f=1/9 to 39/1, preferably 5/10 to 34/1

The liquid crystalline polyesters of the present invention can be obtained by condensation copolymerization of monomer components corresponding to the above-described units. The polymerization method includes, but is not limited to, polymerization methods known in the art, and for example, the melting polymerization method or solution polymerization method can be used for synthesis.

In the case where the liquid crystalline polyesters of the present invention are synthesized by melting polymerization, for example a predetermined amount of 4'-acetoxy-3'-methoxy-4-stilbenecarboxylic acid (structural unit (A)-forming monomer), 4,4'-stilbenedicarboxylic acid (structural unit (B)-forming monomer) and catechol diacetate (structural unit (C)-forming monomer) are polymerized at high temperature, under reduced pressure or under high vacuum whereby the objective polyesters can be easily obtained. Here, as the charging ratio (molar ratio) of the monomer components constituting the structural units (A), (B), (C), (D), (E), and (F), the value of A/(B+C), A/(B+C+D), A/(B+C+D+2F), (A+E)/(B+C), (A+E)/(B+C+D) or (A+E)/(B+C+D+2F) is in the range of usually 20/80 to 80/20, preferably 25/75 to 75/25, more preferably 30/70 to 70/30. The value of A/E is in the range of 1/19 to 79/1, preferably 10/20 to 69/1. The value of B/2F is in the range of 1/9 to 39/1, preferably 5/10 to 34/1. Further, the value of B/C or (B+2F)/(C+D) is approximately 1 and is in the range of usually 45/55 to 55/45, preferably 48/52 to 52/48. The value of C/D is in the range of 1/9 to 39/1, preferably 5/10 to 34/1. Each monomer is used in the above ranges in such a relationship that the carboxyl group (or its derivative) and the hydroxyl group (or its derivative) are used in equal moles.

Although the polymerization conditions are not particularly limited, the temperature is usually 150 to 350° C., preferably 200 to 300° C., and the reaction time is usually 30 minutes or more, preferably 1 to 40 hours or so. The polymerization is carried out preferably under normal pressure. To promote the polymerization reaction, amines such as 1-methylimidazole, 4-dimethylaminopyridine etc., alkali metal salts, and metal salts with Fe, Mn, Ti, Co, Sb, Sn etc. may be used solely or in combination thereof.

The molecular weight of the liquid crystalline polyester of the present invention can be controlled for example by controlling the polymerization time in the same manner as in the conventional condensation reaction.

The molecular weight of the optically active liquid crystalline polyester of the present invention is usually 0.05 to 0.5, preferably 0.07 to 0.4, more preferably 0.1 to 0.3, in terms of logarithmic viscosity [ηinh] as determined at 30° C. in a phenol/tetrachloroethane mixed solvent (ratio of 60/40 by part). If the value of ηinh is less than 0.05, the strength of the resulting polyester may be lowered, so there may occur a problem with practical use. If the value of ηinh is more than 0.5, the fluidity of the resulting polyester in a liquid crystalline state may be decreased so that it may be difficult to obtain uniform orientation.

In the case where the liquid crystalline polyesters of the present invention are produced by solution polymerization, for example a predetermined amount of 4'-hydroxy-3'-methoxy-4-stilbenecarboxylic acid (structural unit (A)-forming monomer), 4,4'-stilbenedicarboxylic acid (structural unit (B)-forming monomer) and catechol (structural unit (C)-forming monomer) are dissolved in a solvent and heated. Alternatively, these are dissolved in pyridine etc. and heated in the presence of aryl sulfonyl chloride/dimethylformamide or diphenyl chlorophosphate/dimethylformamide whereby the objective polyesters can be easily obtained.

The charging ratio (molar ratio) of the monomer components constituting the structural units (A), (B), (C), (D), (E) and (F) in synthesis of the liquid crystalline polyesters of the present invention by solution polymerization is the same as in the above-described melting polymerization method. Specifically, the value of A/(B+C), A/(B+C+D), A/(B+C+

D+2F), (A+E)/(B+C), (A+E)/(B+C+D) or (A+E)/(B+C+D+2F) is in the range of usually 20/80 to 80/20, preferably 25/75 to 75/25, more preferably 30/70 to 70/30. The value of A/E is in the range of 1/19 to 79/1, preferably 10/20 to 69/1. The value of B/2F is in the range of 1/9 to 39/1, preferably 5/10 to 34/1. Further, the value of B/C or (B+2F)/(C+D) is approximately 1 and is in the range of usually 45/55 to 55/45, preferably 48/52 to 52/48. The value of C/D is in the range of 1/9 to 39/1, preferably 5/10 to 34/1.

The solvent used for solution polymerization includes, but is not limited to, halogen based solvents such as o-dichlorobenzene, dichloroethane, tetrachloroethane etc., polar solvents such as dimethyl sulfoxide (DMSO), dimethylformamide (DMF), N-methylpyrrolidone (NMP) etc., and ether based solvents such as tetrahydrofurane (THF), dioxane etc. The acid acceptor includes, but is not limited to, pyridine, triethylamine, tripropylamine etc. Although the reaction conditions for solution polymerization is not particularly limited, the temperature is usually 50 to 200° C., preferably 60 to 150° C., and the reaction temperature is usually 1 hour or more, preferably 2 hours to 10 hours or so.

The liquid crystalline polyesters of the present invention obtained in this manner can form a nematic phase or a smectic phase usually in a liquid crystalline state, depending on the percentage composition of the structural units constituting said polyesters. When the polyesters in a liquid crystalline state are cooled at an arbitrary cooling rate, transition of the phase to a crystalline phase does substantially not occur. Simultaneously the polyesters are characterized in that below the liquid crystalline transition temperature (glass transition temperature), the state of molecular orientation in the liquid crystalline state, specifically the state of molecular orientation in the nematic phase or smectic phase can be maintained as such.

Further, the liquid crystalline polyesters of the present invention may be used as a composition after mixed with other liquid crystalline polymers, non-liquid crystalline polymers etc. Further, optically active monomers or polymers can be incorporated into said polyesters whereby a liquid crystalline composition with a cholesteric phase or a twisted nematic phase as the liquid crystalline phase can also be obtained.

In particular, the liquid crystalline polyesters of the present invention can be made a composition with the optically active liquid crystalline polyesters (component II) whereby a new optical film having a high double refractive index and a broad selective reflection zone width can be obtained.

Component II i.e. optically active crystalline polyesters are described. Said polyesters are optically active crystalline polyesters composed of structural units (G) and (H).

The structural unit (G) is an essential component functioning as a mesogen for expressing liquid crystallinity, and specifically it is an unit derived from 4,4'-stilbenezenedicarboxylic acid, 4,4'-biphenyldicarboxylic acid, 2,6-naphthalenedicarboxylic acid, terephthalic acid or functional derivatives thereof (e.g. dialkyl esters such as dimethyl ester etc. and acid chlorides such as dichloride etc.). The structural unit (G) is contained in an amount of usually 30 to 60 mol %, preferably 30 to 50 mol %, more preferably 35 to 50 mol % in the optically active liquid crystalline polyesters. The structural unit (G) may contain 2 kinds of different units in said polyesters. Specifically, the optically active liquid crystalline polyesters containing 2 or more kinds of the structural unit (G) can be obtained by subjecting e.g. 4,4'-stilbenedicarboxylic acid and 4,4'-biphenyldicarboxylic acid, 2,6-naphthalenedicarboxylic acid, or terephthalic acid as the structural unit (G)-forming monomers to polyester synthesis described below.

The structural unit (H) is an essential component for expressing a cholesteric liquid crystalline phase, and specifically it is an unit formed from optically active 2-methyl-1,4-butanediol, 2,4-pentanediol, 1,2-propanediol, 2-chloro-1,4-butanediol, 2-fluoro-1,4-butanediol, 2-bromo-1,4-butanediol, 2-ethyl-1,4-butanediol, 2-propyl-1,4-butanediol or functional derivatives thereof (e.g. derivatives such as diacetoxy compounds). The above-described diols may be R- or S-isomers or a mixture of R- and S-isomers. In the case of a mixture of R-and S-isomers, the difference therebetween should be at least 1%, preferably 10% or more, more preferably 20% or more. If the difference between R- and S-isomers is less than 1%, the cholesteric liquid crystalline may not occur so this is not preferable. Further, the structural unit (H) is contained in an amount of usually 40 to 70 mol %, preferably 50 to 70 mol %, more preferably 50 to 65 mol % in the optically active liquid crystalline polyesters. Accordingly, said liquid crystalline polyester contains the structural unit (H) in a larger amount than the structural unit (G), and thus said polyester usually forms a molecular chain structure with hydroxyl groups remaining at both the ends.

The optically active liquid crystalline polyesters as described above can be exemplified as follows:

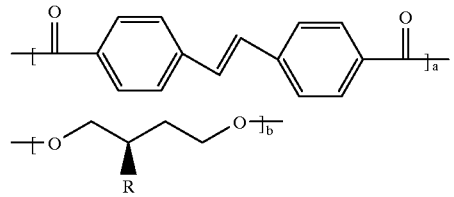

R: Me, Et, Pr, F, Cl
a: 30 to 60 mol %, preferably 30 to 50 mol %
b: 40 to 70 mol %, preferably 50 to 70 mol %

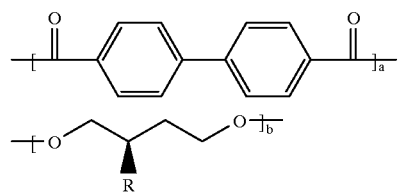

R: Me, Et, Pr, F, Cl
a: 30 to 60 mol %, preferably 30 to 50 mol %
b: 40 to 70 mol %, preferably 50 to 70 mol %

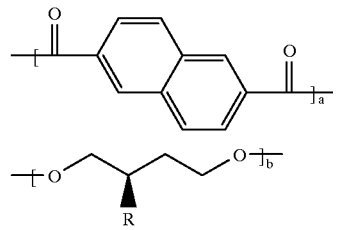

R: Me, Et, Pr, F, Cl
a: 30 to 60 mol %, preferably 30 to 50 mol %
b: 40 to 70 mol %, preferably 50 to 70 mol %

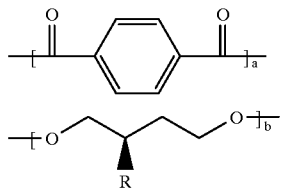

R: Me, Et, Pr, F, Cl
a: 30 to 60 mol %, preferably 30 to 50 mol %
b: 40 to 70 mol %, preferably 50 to 70 mol %

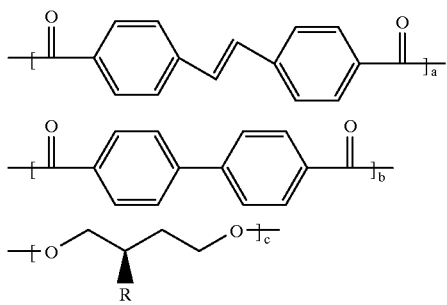

R: Me, Et, Pr, F, Cl
a+b: 30 to 60 mol %, a/b=1/29 to 59/1, preferably a+b: 30 to 50 mol %, a/b=5/25 to 49/1
c: 40 to 70 mol %, preferably 50 to 70 mol %

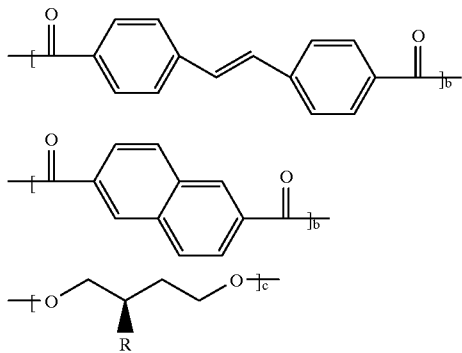

R: Me, Et, Pr, F, Cl
a+b: 30 to 60 mol %, a/b=1/29 to 59/1, preferably a+b: 30 to 50 mol %, a/b=5/25 to 49/1
c: 40 to 70 mol %, preferably 50 to 70 mol %

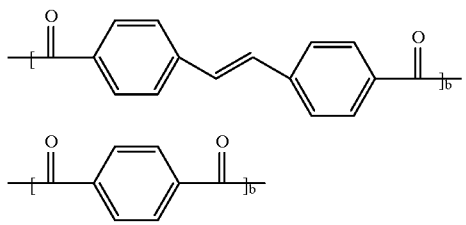

-continued

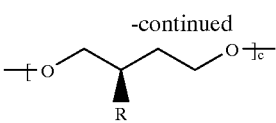

R: Me, Et, Pr, F, Cl
a+b: 30 to 60 mol %, a/b=1/29 to 59/1, preferably a+b: 30 to 50 mol %, a/b=5/25 to 49/1
c: 40 to 70 mol %, preferably 50 to 70 mol %

Component II i.e. the optically active liquid crystalline polyesters used in the present invention can be obtained by copolymerization of monomer components corresponding to the above-described structural units. The polymerization method is not particularly limited, and the conventional melting polymerization method or solution polymerization method can be used for production.

In the case where the optically active liquid crystalline polyesters are synthesized by the melting polymerization method, a predetermined amount of dimethyl 4,4'-stilbenedicarboxylate (structural unit (G)-forming monomer) and optically active 2-methyl-1,4-butanediol (structural unit (H)-forming monomer), for example, are polymerized at high temperature, under reduced pressure or under high vacuum, whereby the objective polyesters can be easily obtained. As the charging ratio (molar ratio) of the structural units (G) and (H), the value of G/H is in the range of usually 30/70 to 60/40, preferably 30/70 to 50/50, more preferably 35/65 to 50/50.

Although the polymerization conditions are not particularly limited, the temperature is usually 150 to 350° C., preferably 200 to 300° C., and the reaction time is usually 30 minutes or more, preferably 1 to 40 hours or so. The polymerization reaction is carried out preferably under normal pressure. To promote the polymerization reaction, amines such as 1-methylimidazole, 4-dimethylaminopyridine etc., alkali metal salts, and metal salts with Fe, Mn, Cd, Mg, Ba, Ti, Zn, Pb, Co, Sb, Sn etc. may be used solely or in combination thereof. Further, phosphorus compounds etc. may be added as decomposition inhibitors.

The molecular weight of the optically active liquid crystalline polyester can be controlled for example by controlling the polymerization time in the same manner as in the conventional condensation reaction.

The molecular weight of the optically active liquid crystalline polyester is usually 0.05 to 0.5, preferably 0.07 to 0.4, more preferably 0.1 to 0.3, in terms of ηinh as determined at 30° C. in a phenol/tetrachloroethane mixed solvent (ratio of 60/40 by part). If the value of ηinh is less than 0.05, the strength of a composition consisting of Component I and the liquid crystalline polyester as described may be lowered, so there is a problem with practical use. If the value of ηinh is more than 0.5, the fluidity of the composition of Component I and the liquid crystalline polyester in the liquid crystalline state may be decreased so that it may be difficult to obtain uniform orientation.

In the case where the optically active liquid crystalline polyesters are produced by the solution polymerization method, for example a predetermined amount of 4,4'-stilbenedicarbonyl halide (structural unit (G)-forming monomer) and optically active 2-methyl-1,4-butanediol (structural unit (H)-forming monomer) are dissolved in a solvent and heated in the presence of an acid acceptor such as pyridine, whereby the objective polyesters can be easily obtained.

Here, the 4,4'-stilbenedicarbonyl halide includes 4,4'-stilbenedicarbonyl chloride 4,4'-stilbenedicarbonyl bromide etc.

The charging ratio (molar ratio) of the monomer components constituting the structural units (G) and (H) in synthesis of said liquid crystalline polyesters by the solution polymerization method is the same as in the melting polymerization method described above. Specifically, the value of G/H is in the range of usually 30/70 to 60/40, preferably 30/70 to 50/50, more preferably 35/65 to 50/50.

The solvent used for melting polymerization includes, but is not limited to, halogen based solvents such as o-dichlorobenzene, dichloroethane, tetrachloroethane etc., polar solvents such as dimethyl sulfoxide (DMSO), dimethylformamide (DMF), N-methylpyrrolidone (NMP) etc., and ether based solvents such as tetrahydrofurane (THF), dioxane etc. The acid acceptor includes, but is not limited to, pyridine, triethylamine, tripropylamine etc. Although the reaction conditions for solution polymerization are not particularly limited, the temperature is usually 50 to 200° C., preferably 60 to 150° C., and the reaction temperature is usually 1 hour or more, preferably 2 hours to 10 hours or so.

The liquid crystalline polyester composition of the present invention contains the above-described liquid crystalline polyester i.e. component I in an amount of 50 to 99.5% by weight, preferably 60 to 90%, more preferably 70 to 80%, and the above-described optically active liquid crystalline polyester i.e. component II in an amount of 0.5 to 50% by weight, preferably 10 to 40%, more preferably 20 to 30%. A content of less than 50% liquid crystalline polyester as component I may cause a reduction in glass transition temperature and is not desirable for thermostability. A content of 99.5% or more may result in a too broad helical pitch to achieve practical selective reflection. To determine the formulation of the liquid crystalline polyester composition of the present invention, the selective reflection though also changed depending on the composition of each polyester is shifted to the IR region if the content of the liquid crystalline polyester as component I is about 85% or more. If its content is about 65% or less, it is shifted to the UV range. In consideration of these, the formulation of said composition shall be determined.

The method of mixing the liquid crystalline polyester as component I with the optically active liquid crystalline polyester as component II is not particularly limited. For example, it is possible to use a method in which components I and II are mixed under heating over the melting point or dissolved in a suitable solvent and then mixed. In the present invention, mixing under heating at a high temperature of 200 to 270° C. is recommended as a preferable mixing method.

In the liquid crystalline polyester composition obtained in this manner, there does substantially not occur transition of its phase to a crystalline phase upon cooling said composition in the liquid crystalline state at an arbitrary cooling rate. Further, the liquid crystalline polyester composition of the present invention exhibits monodomain cholesteric orientation in the liquid crystalline state, and the state of this orientation can be easily fixed. For stable fixation of the cholesteric orientation, it is important that there is no crystalline phase at lower temperatures than the cholesteric phase in view of the phase series of the liquid crystal. If there is the crystalline phase at lower temperatures than the cholesteric phase, the composition passes through the crystalline phase inevitably upon cooling for fixation, resulting in destruction of the cholesteric orientation once obtained. The liquid crystalline polyester composition of the present invention forms monodomain cholesteric orientation fundamentally in the liquid crystalline state, and becomes a glass state below the liquid crystalline transition temperature. Accordingly, said composition is characterized in that below the liquid crystalline transition temperature (glass transition temperature), the state of molecular orientation in the liquid crystalline state, specifically the state of cholesteric orientation can be maintained as such. This characteristic can be utilized to produce a new optical film.

It is preferable in the present invention that said optical film includes the following orientation substrate and undergoes each of the following steps.

The orientation substrate specifically includes e.g. plastic substrates such as polyimide, polyimide amide, polyamide, polyether imide, polyether ketone, polyketone sulfide, polyether sulfone, polysulfone, polyphenylene sulfide, polyphenylene oxide, polyethylene terephthalate, polyethylene naphthalate, polycarbonate, polyarylate, acrylic resin, polyvinyl alcohol, phenol resin etc., said plastic film substrates subjected to rubbing treatment on the surface, and glass substrates with anisotropy inside, such as alkali glass, borosilicate glass, flint glass etc. which are slit-etched on the surface, and these are preferably used.

The optical film of the present invention can be obtained by applying the liquid crystalline polyester (composition) uniformly on the orientation substrate described above, followed by the step of uniform orientation and the step of fixing the orientation state. Application of said polyester (composition) onto the orientation substrate can be conducted usually in the state of a solution of said polyester (composition) dissolved in various solvents or in the state of a melt of said polyester (composition). Solution application where the liquid crystalline polyester (composition) is applied in the form of a solution dissolved in a solvent is preferable in the production process.

Now, the solution application is described.

The liquid crystalline polyester (composition) of the present invention is dissolved in a solvent to prepare a solution at a predetermined concentration. Because the thickness of a film (thickness of a film formed from the liquid crystalline polyester (composition)) is determined at the stage of application thereof onto a substrate, accurate regulation of the concentration, the thickness of the coated film etc. is required.

Although the solvent should be selected depending on the proportion of components in the liquid crystalline polyester (composition) of the present invention, the following solvents are usually used: halogenated hydrocarbons such as chloroform, dichloromethane, carbon tetrachloride, dichloroethane, tetrachloroethane, trichloroethylene, tetrachloroethylene, chlorobenzene, orthodichlorobenzene etc., phenols such as phenol, parachlorophenol etc., aromatic hydrocarbons such as benzene, toluene, xylene, methoxybenzene, 1,2-dimethoxybenzene etc., acetone, ethyl acetate, tert-butyl alcohol, glycerin, ethylene glycol, triethylene glycol, ethylene glycol monomethyl ether, diethylene glycol dimethyl ether, ethyl Cellosolve, butyl Cellosolve, 2-pyrrolidone, N-methylpyrrolidone, pyridine, triethylamine, tetrahydrofurane, dimethylformamide, dimethylacetamine, dimethyl sulfoxide, acetonitrile, butyronitrile, carbon disulfide etc., and mixed solvents thereof, such as mixed solvents of halogenated hydrocarbons and phenols.

Although the concentration of the solution varies depending on the solubility of the used liquid crystalline polyester (composition) and the thickness of the objective optical film, the concentration is in the range of usually 3 to 50% by weight, preferably in the range of 7 to 30% by weight. By adjusting the solution to the above concentration range, it is possible to obtain an optical film of usually 0.1 to 20 µm, preferably 0.2 to 10 µm, more preferably 0.3 to 5 µm in thickness.

The solution of the liquid crystalline polyester (composition) adjusted to a desired concentration in the above-enumerated solvent is applied to the orientation substrate described above. As the application method, it is possible to employ spin coating, roll coating, die coating, printing, dipping coating, curtain coating etc.

After drying, the solvent is removed to form a layer of said polyester (composition) of uniform thickness on the orientation substrate. The conditions for solvent removal are not particularly limited insofar as the solvent is almost removed and the layer of said polyester (composition) is not fluidized or lost by flowing. Usually, drying at room temperature, drying in a drying oven, warm or hot air blow is utilized to remove the solvent.

After drying, heat treatment is conducted usually in the range of 50 to 300° C., preferably 100 to 260° C. to form cholesteric orientation. Although the treatment time varies depending on the percentage composition of the liquid crystalline polyester (composition), it is usually in the range of 10 seconds to 120 minutes, preferably 30 seconds to 60 minutes. In the case of 10 seconds or less, the cholesteric orientation may be insufficient. 120 minutes or more is not preferable because productivity may be lowered.

In this manner, uniform orientation in a liquid crystalline state over the whole surface of the orientation substrate can be obtained.

In the above-described heat treatment step in the present invention, a magnetic field or electric field may be used for uniform orientation of the liquid crystalline polyester (composition).

Then, by cooling the uniform orientation formed by heat treatment to a temperature of not more than the liquid crystalline transition point of said polyester (composition), the uniformity of said orientation can be fixed without deterioration thereof.

The above cooling temperature is not particularly limited insofar as it is a temperature of the liquid crystalline transition point or less. For example, by cooling at a temperature lower by 10° C. than the liquid crystalline transition point, uniform cholesteric orientation can be fixed. The cooling means is not particularly limited, and the orientation can be fixed by cooling from the heating atmosphere in the heat treatment step to the atmosphere below the liquid crystalline transition point, for example by merely placing it at room temperature. Further, to increase production efficiency, forcible cooling such as air cooling, water cooling etc. or slow cooling may be conducted.

After the above steps, the optical film of the present invention can be obtained.

The form of said optical film for use includes:

(1) The optical film only is used after said film is removed from the above orientation substrate;

(2) The optical film is used as such on the orientation substrate; and (3) The optical film is used after laminated on another substrate different from the orientation substrate.

In the case where the film only is used, the film is obtained by a method of mechanically removing it from the orientation substrate by use of a roll etc. in the interface with the optical film, a method of mechanically removing it after immersion in poor solvent toward all structural materials, a method of removing it by ultrasonication in poor solvent, a method of removing it by changing the temperature to utilize the difference in thermal expansion coefficient between the orientation substrate and said film, and a method of removing it by dissolving the orientation substrate itself or the orientation membrane on the orientation substrate. The releasability varies depending on the percentage composition of the liquid crystalline polyester (composition) used and the adherence to the orientation substrate, and thus the most suitable method for the system should be adopted. If the optical film itself is used as an optical element, it may not have self-supporting properties depending on membrane thickness, so in such a case, it is preferable for strength and reliability to fix the optical film via an adhesive or self-adhesive to optically preferably substrates, for example, plastic substrates such as polymethacrylate, polycarbonate, polyvinyl alcohol, polyether sulfone, polysulfone, polyarylate, polyimide, amorphous polyolefin, triacetyl cellulose etc.

Then, the case where the optical film is used on the orientation substrate is described. If the orientation substrate is transparent and optically isotropic, or if said orientation substrate is a necessary element for the optical film for use as an optical element, the substrate itself can be used as the objective optical element.

The optical film of the present invention obtained by fixing the orientation of the liquid crystalline polyester (composition) on the orientation substrate can also be used by removing it from said substrate and then laminating it on another substrate more suitable for optical use. That is, a laminate composed of said film and a substrate different from the orientation substrate can be integrated as e.g. an optical element into TN-LCD etc. Specifically, the following method can be adopted.

A substrate (referred to hereinafter as the second substrate) suitable for the objective optical element is stuck via e.g. an adhesive or self-adhesive to the optical film on the orientation substrate. Then, the orientation substrate is removed in the interface with the optical film of the present invention, and said film is transferred to the side of the second substrate suitable for the optical element to give the optical element.

The second substrate used in transfer is not particularly limited insofar as it has a suitable plane, but glass substrates, and plastic films which are transparent and have optical isotropy, are preferably used. Examples of such plastic films include polymethylmethacrylate, polystyrene, polycarbonate, polyether sulfone, polyphenylene sulfide, polyarylate, amorphous polyolefin, triacetyl cellulose or epoxy resin etc. Among these, polymethylmethacrylate, polycarbonate, polyarylate, polyether sulfone, triacetyl cellulose etc. are preferably used. Further, an optically anisotropic film can also be used insofar as it is a member necessary for the optical element. Such examples include a film with different phases, polarized film etc. obtained by drawing plastic films such as polycarbonate, polystyrene etc.

The adhesive or self-adhesive for adhesive-bonding the second substrate used for transfer, to the optical film of the present invention is preferably of optical grade and may be acrylic type, epoxy type, ethylene-vinyl acetate copolymer type, rubber type, urethane type, and a mixture thereof. As the adhesive, any adhesive of heat-setting type, photo-setting type or electron beam-setting type can be used without any problem insofar as it has optical isotropy.

Transfer of the optical film of the present invention to the second substrate suitable for the optical element can be effected by adhesive-bonding the optical film to the second substrate and then removing the orientation substrate from the interface with said film. As described above, the removing method includes a method of mechanically removing it by use of a roll etc., a method of removing it by ultrasonication in poor solvent, a method of removing it by changing the temperature to utilize the difference in thermal expansion coefficient between the orientation substrate and said film, and a method of removing it by dissolving the orientation substrate itself or the orientation membrane on the orientation substrate. The releasability varies depending on the percentage composition of the liquid crystalline polyester composition used and the adherence to the orientation substrate, and thus the most suitable method for the system should be adopted.

The optical film of the present invention can also be provided with a protective layer such as a transparent plastic film for the purposes of protecting the surface, increasing the strength, and improving environmental reliability.

The optical film of the present invention obtained in this manner shows a double refractive index of 0.3 or more at a wavelength of 590 nm usually depending on the type and percentage composition of the respective structural units constituting the liquid crystalline polyester. In the case of the composition, the zone width of its cholesteric selective reflection spectrum at a wavelength of 590 nm has a physical value of 100 nm or more depending on the percentage composition. The above double refractive index and the zone width of the cholesteric selective reflection spectrum can be measured by means known in the art.

As described above, the liquid crystalline polyester of the present invention is suitable as an optical material since it is excellent in the orientation properties and fixing ability and simultaneously has the ability to form an uniform film.

Further, high double refractive index difficult to attain by a film consisting of conventional self-orientation type polymeric liquid crystals can be achieved by the optical film formed from the liquid crystalline polyester of the present invention by regulating the type of each structural unit constituting said polyester, the percentage composition etc., so development of new optical application can be expected.

Further, the liquid crystalline polyester composition of the present invention exhibits uniform monodomain cholesteric orientation in the liquid crystalline state and simultaneously has said cholesteric orientation fixed in it. Furthermore, the double refractive index and selective reflection zone width can be regulated to desired values by changing the ratio of the components in the liquid crystalline polyester composition and the type of the polyester.

The liquid crystalline polyester (composition) of the present invention and the optical film consisting of the same can be highly expected for uses in optical and photoelectric fields and are of highly industrial value.

In addition, the optical film of the present invention, if having pitches in the region of visible rays, shows a very beautiful color and is useful as decorations and fashion articles, so its application to various fields is expected.

EXAMPLES

Hereinafter, the Examples are described, but the present invention is not limited thereto. The respective analysis methods used in the Examples are as follows.

1. Logarithmic viscosity

Determined at a polymer concentration of 0.5 g/dl at 30° C. in phenol/1,1,2,2-tetrachloroethane=60/40 (ratio by weight) in an Ubbellohde viscometer.

2. Glass transition temperature

Determined at an increasing temperature of 20° C. /min. in Dupont 990 Thermal Analyzer.

3. Observation of optical textures

Observed using Hot Stage FP80/82 (Metler) and a BH-2 polarization microscope (Olympus Optical Co., Ltd.).

4. Determination of the composition

The resulting polyester was dissolved in deuterated chloroform or deuterated trifluoroacetic acid and measured in 400 MHz $^1$H-NMR (JNM-EX 400, JEOL Ltd.).

5. Measurement of double refractive index (1) Measurement of the double refractive index Δn of the liquid crystalline polyester (Component I)

A 15% wt % N-methylpyrrolidone (NMP) solution of the polymer is prepared, and this solution is applied by a spin coater onto a substrate subjected to orientation treatment (rubbing treatment). Then, the substrate is dried on a hot plate and heat-treated in a drying oven, and then cooled gradually to give a film fixed in the uniform nematic orientation state. The quenching axis of the resulting film is confirmed under cross Nicols by a polarization microscope provided with a rotating stage, and "ne" is assigned to the refractive index of the quenching axis along the direction of rubbing treatment, and "no" is assigned to the refractive index of the vertical quenching axis.

In the case of ne<1.8, no<1.8

"ne" and "no" were measured by an Abbe refractometer under NaD ray (590 nm) to determine the double refractive index Δn (590 nm)=ne (590 nm)−no (590 nm).

In the case of ne≧1.8, no<1.8

"no" was measured by an Abbe refractometer under NaD ray (590 nm). Then, nexd (590 nm) and noxd (590 nm) at 590 nm were determined respectively using polarized light along the film quenching axis by an interference film thickness measuring meter. Here, d is film thickness. From no (590 nm) obtained by the Abbe refractometer, the film thickness d was calculated as d=noxd (590 nm)/no (590 nm). The resulting film thickness d was used to calculate ne=nexd (590 nm)/d whereby double refractive index Δn (590 nm)= ne−no was obtained.

(2) Method of measuring the double refractive index Δn of the liquid crystalline polyester composition A 15 wt % NMP solution of said composition is prepared, and this solution is applied by a spin coater onto a substrate subjected to orientation treatment (rubbing treatment). Then, the substrate is dried on a hot plate and heat-treated in a drying oven, and then cooled gradually to give a film fixed in the uniform cholesteric orientation state. The resulting film is measured for an UV-IR spectrometric spectrum, and the selective reflection zone width Δλ and the central wavelength λs of the selective reflection are measured. On the basis of these measurements, simulation is conducted on the basis of the following formula, and the most approximate ne value to the measured Δλ was calculated.

$$\Delta \lambda = \Delta n \times \lambda s / N$$

$$N = \sqrt{((no^2 + ne^2)/2)}$$

From the obtained ne value, Δn was calculated using the following equation:

$$\Delta n = ne - no$$

Here, "no" used in the calculation is the measurement value of the liquid crystalline polyester (Component I) accounting for almost all of the liquid crystalline polyester composition used in the measurement. However, no is an assumed value without considering the refractive index of [II in the formula] and contains some errors. To obtain more accurate double refractive index Δn, it is necessary to measure the refractive index of a composition prepared by obtaining a racemic polyester of the optically active liquid crystalline polyester (Component II) and then mixing said polyester with the liquid crystalline polyester (Component I).

Example 1

A polymerization vessel equipped with a stirring apparatus, a nitrogen inlet tube and a liquid trap was charged with 14.06 g (45 mmol) of 4'-acetoxy-3'-methoxy-4-stilbenecarboxylic acid, 3.45 g (15 mmol) of 6-acetoxy-2-naphthoic acid, 6.12 g (31.5 mmol) of catechol diacetate, and 4.98 g (30 mmol) of terephthalic acid, and the atmosphere in the vessel was replaced by nitrogen. While formed acetic acid was distilled off under a nitrogen atmosphere, the mixture was reacted at 240° C. for 2 hours, at 260° C. for 2 hours, and further at 270° C. for 12 hours, and while nitrogen was introduced at 10 ml/min. through the nitrogen inlet tube, the reaction was further continued at 270° C. for 1 hour. The resulting polyester had a logarithmic viscosity of 0.19 and a glass transition temperature of 110° C. As a result of observation under a polarization microscope, this polyester indicated a cholesteric liquid crystalline phase over the glass transition temperature and there did not occur transition thereof to a crystalline phase even cooled below the glass transition temperature, and its nematic liquid crystalline state could be fixed.

Then, a 15 wt % tetrachloroethane solution of the resulting polyester was prepared. This solution was applied by spin coating onto a rubbing polyimide orientation membrane. Then, the solvent was removed by drying and the membrane was heat-treated at 210° C. for 10 minutes. As a result, a film of the liquid crystalline polyester was obtained on the rubbing polyimide orientation membrane. The resulting film was transparent and free of orientation defects and had an uniform film thickness (2.1 μm).

As a result of the measurement of the double refractive index of said film, the double refractive index (Δn) at the wavelength of 590 nm was 0.393 (ne: 1.973, no: 1.580).

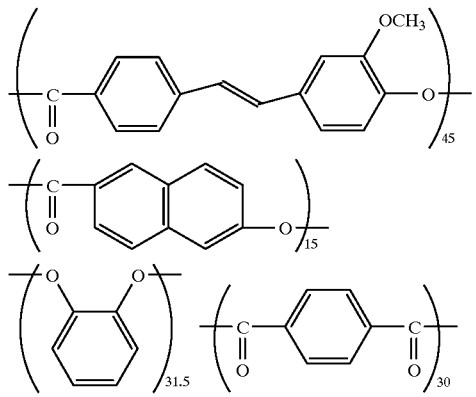

Examples 2 to 13

Reaction was conducted in the same technique as in Example 1 except that the monomer charging ratio was changed. The results are shown in Tables 1 and 2. As a result of observation under a polarization microscope, all the resulting polyesters indicated a nematic liquid crystalline phase over the glass transition temperature and there did not occur transition thereof to a crystalline phase even cooled below the glass transition temperature, and their nematic liquid crystalline state could be fixed. Every polyester thus obtained was formed into a film in the same manner as in Example 1, and as a result of measurement of its double refractive index at the wavelength of 590 nm, the result of 0.3 or more was obtained for any film.

Comparative Example 1

Reaction was conducted in the same technique as in Synthesis Example 1 except that 7.28 g (35 mmol) of methylhydroquinone diacetate, 12.62 g (65 mmol) of catechol diacetate and 16.61 g (100 mmol) of terephthalic acid were used. The resulting polyester had a logarithmic viscosity of 0.15 and a glass transition temperature of 108° C.

As a result of observation under a polarization microscope, this polyester indicated a nematic liquid crystalline phase over the glass transition temperature and there did not occur transition thereof to a crystalline phase even cooled below the glass transition temperature, and its nematic liquid crystalline state could be fixed. A film was prepared therefrom and measured for its double refractive index. The result indicated that the double refractive index (Δn) of this polyester where the liquid crystalline state was fixed was 0.20 ($n_e$: 1.750, $N_o$: 1.550).

TABLE 1

Examples 2 to 13

| Example | Monomer (proportion) | | | |
|---|---|---|---|---|
| 2 | StV (1.0) | TPA (1.0) | CTDA (1.05) | |
| 3 | StV (1.5) | TPA (1.0) | CTDA (1.05) | |
| 4 | StE (2.0) | DPEC (1.0) | CTDA (1.05) | 6A2NA (0.5) |
| 5 | StV (1.5) | NDCA (1.0) | CTDA (1.05) | 6A2NA (0.5) |
| 6 | StV (1.75) | TPA (1.0) | CTDA (1.05) | 6A2NA (0.5) |
| 7 | StV (2.0) | TPA (1.0) | CTDA (1.05) | |
| 8 | StV (2.0) | TPA (1.0) | CTDA (1.05) | 6A2NA (0.5) |
| 9 | StV, StE (1.0, 1.0) | TPA (1.0) | CTDA (1.05) | 6A2NA (0.5) |
| 10 | StV (2.0) | SDCA (1.0) | CTDA (1.05) | 6A2NA (0.5) |
| 11 | StE (2.0) | BTPA (1.0) | CTDA (1.05) | 6A2NA (0.5) |
| 12 | StE (3.0) | BTPA (1.0) | CTDA (1.05) | 6A2NA (0.75) |

StV: 4'-acetoxy-3'-methoxy-4-stilbenecarboxylic acid
StE: 4'-acetoxy-3'-ethoxy-4-stilbenecarboxylic acid
TPA: terephthalic acid
NDCA: 2,6-naphthalenedicarboxylic acid
SDCA: 4,4'-stilbenedicarboxylic acid
BTPA: 2-bromoterephthalic acid
CTDA: catechol diacetate
6A2NA: 6-acetoxy-2-naphthoic acid
DPEC: 4,4'-dicarboxydiphenyl ether

TABLE 2

Examples 2 to 13

| Example | ηinh | Tg ° C. | Δn | ne | no |
|---|---|---|---|---|---|
| 2 | 0.152 | 109.1 | 0.373 | 1.949 | 1.576 |
| 3 | 0.181 | 117.7 | 0.377 | 1.946 | 1.569 |
| 4 | 0.294 | 98.2 | 0.351 | 1.927 | 1.576 |
| 5 | 0.246 | 123.6 | 0.411 | 2.000 | 1.589 |
| 6 | 0.173 | 102.9 | 0.393 | 1.967 | 1.574 |
| 7 | 0.159 | 94.4 | 0.425 | 1.998 | 1.573 |
| 8 | 0.267 | 117.6 | 0.431 | 2.010 | 1.579 |
| 9 | 0.259 | 109.4 | 0.439 | 2.015 | 1.575 |
| 10 | 0.270 | 110.8 | 0.464 | 2.043 | 1.579 |
| 11 | 0.254 | 107.3 | 0.357 | 1.940 | 1.583 |
| 12 | 0.184 | 103.2 | 0.411 | 1.984 | 1.573 |

Example 14

A polymerization vessel equipped with a stirring apparatus, a nitrogen inlet tube and a liquid trap was charged with 18.74 g (60 mmol) of 4'-acetoxy-3'-methoxy-4-stilbenecarboxylic acid, 3.45 g (15 mmol) of 6-acetoxy-2-naphthoic acid, 6.12 g (31.5 mmol) of catechol diacetate, 5.36 g (20 mmol) of stilbenedicarboxylic acid, and 5.09 g (20 mmol) of 4'-methoxy-4-stilbenecarboxylic acid, and the atmosphere in the vessel was replaced by nitrogen. While formed acetic acid was distilled off under a nitrogen atmosphere, the mixture was reacted at 240° C. for 2 hours, at 260° C. for 2 hours, at 280° C. for 12 hours, and further at 290° C. for 12 hours. The resulting polyester had a logarithmic viscosity of 0.208 and a glass transition temperature of 109.8° C. As a result of observation under a polarization microscope, this polyester was superior in orientation to show an uniform nematic liquid crystalline phase over the glass transition temperature. Further, this polyester was also superior in the fixation ability, and transition of the uniform nematic liquid phase over the glass transition to a crystalline phase did not occur even when cooled below the glass transition temperature, and the orientation state formed in said nematic liquid crystalline phase could be fixed almost uniformly. As a result of the measurement of the double refractive index, the double refractive index (Δn) of this polyester where the liquid crystalline phase was fixed was 0.464 (ne: 2.043, no: 1.579).

The result of NMR ($^1$H, 270 MHz, 60° C.) is shown in FIG. 4. This polyester is shown in the following formula:

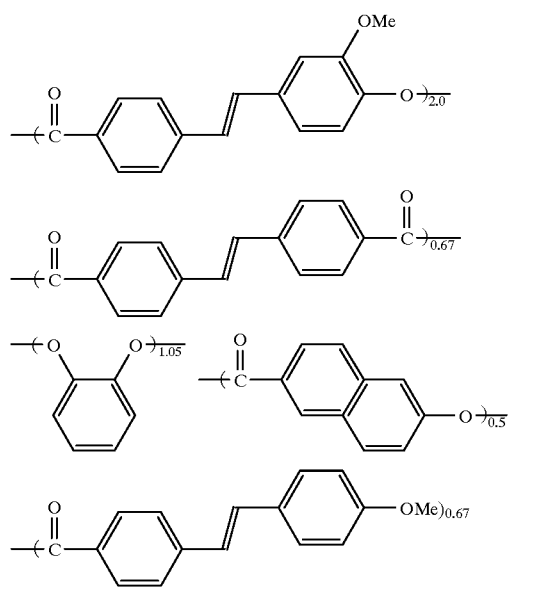

Examples 15 to 27

Reaction was carried out in the same technique as in Example 14 except that the monomer charging ratio was changed. The results are shown in Tables 3 and 4. As a result of all these polyesters under a polarization microscope, they showed a nematic liquid crystal phase over the glass transition temperature, and transition thereof to a liquid crystalline phase did not occur even when cooled below the glass transition temperature, and their nematic liquid crystalline state could be fixed.

NMR ($^1$H, 270 MHz, 60° C.) spectra of the polyesters in Examples 17, 19, 20, 21 and 22 are shown in FIGS. 5, 6, 7, 8 and 9 respectively. The respective polyesters are shown in the following formulae.

(Example 17)

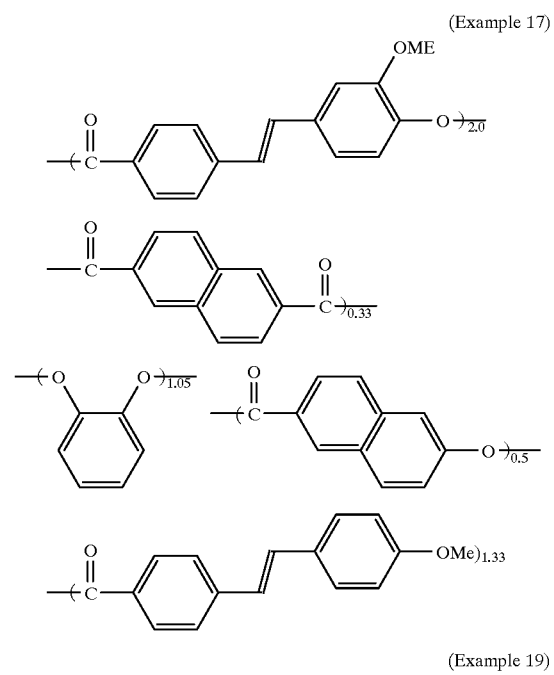

(Example 19)

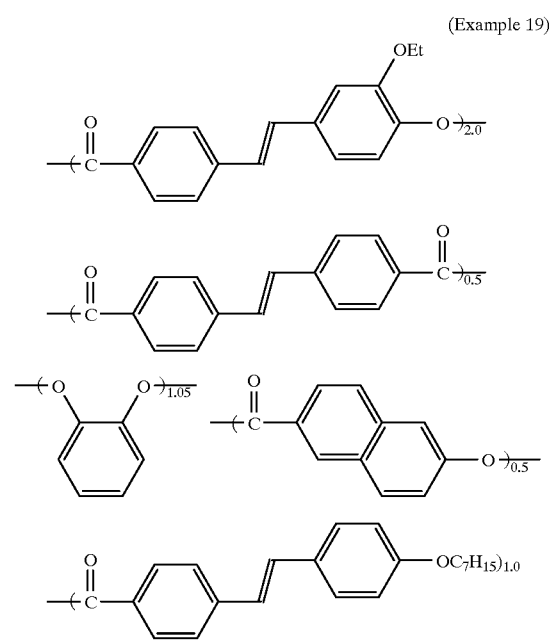

(Example 20)

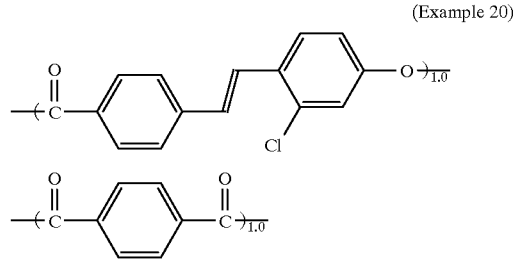

(Example 21)

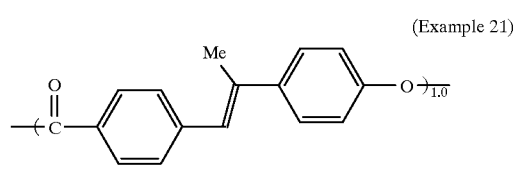

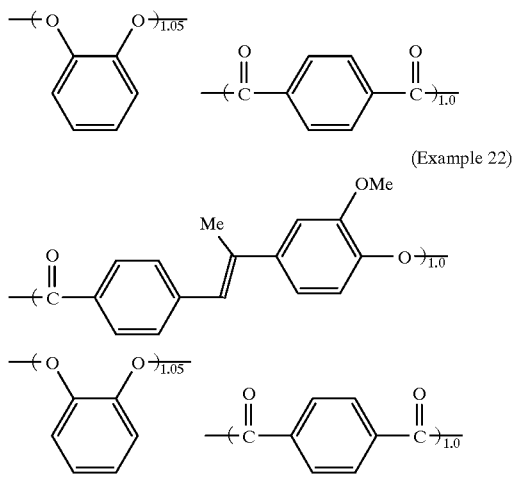

(Example 22)

TABLE 3

| Example | Monomer (proportion) | | | | |
|---|---|---|---|---|---|
| 15 | StV (2.0) | NDCA (0.93) | CTDA (1.05) | 6A2NA (0.5) | C7St (0.14) |
| 16 | StV (2.0) | NDCA (0.67) | CTDA (1.05) | 6A2NA (0.5) | C1St (0.67) |
| 17 | StV (2.0) | NDCA (0.33) | CTDA (1.05) | 6A2NA (0.5) | C1St (1.33) |
| 18 | StV (2.0) | SDCA (0.5) | CTDA (1.05) | 6A2NA (0.5) | DMSt (1.0) |
| 19 | StE (2.0) | SDCA (0.5) | CTDA (1.05) | 6A2NA (0.5) | C7St (1.0) |
| 20 | StC (1.0) | TPA (1.0) | CTDA (1.05) | | |
| 21 | mSH (1.0) | TPA (1.0) | CTDA (1.05) | | |
| 22 | mSH (1.0) | TPA (1.0) | CTDA (1.05) | | |
| 23 | StV (1.0) | CHA (1.0) | CTDA (1.05) | | |
| 24 | StC (1.0) | TPA (0.67) | CTDA (1.05) | C1St (0.67) | |
| 25 | mSH (0.5) | StV (1.0) | TPA (1.0) | CTDA (1.05) | |
| 26 | mSH (0.5) | StV (1.0) | TPA (0.67) | CTDA (1.05) | C1St (0.67) |
| 27 | mSH (0.5) | StV (1.0) | TPA (0.67) | CTDA (1.05) | C1St (0.67) |

StV: 4'-acetoxy-3'-methoxy-4-stilbenecarboxylic acid
StE: 4'-acetoxy-3'-ethoxy-4-stilbenecarboxylic acid
NDCA: 2,6-naphthalenedicarboxylic acid
SDCA: stilbenedicarboxylic acid
CTDA: catechol diacetate
6A2NA: 6-acetoxy-2-naphthoic acid
C7St: 4'-heptoxy-4-stilbenecarboxylic acid
C1St: 4'-methoxy-4-stilbenecarboxylic acid
DMSt: 3',4'-dimethoxy-4-stilbenecarboxylic acid
StC: 4'-acetoxy-2'-chloro-4-stilbenecarboxylic acid
mSH: α-methyl-4'-acetoxy-4-stilbenecarboxylic acid
mSM: α-methyl-4'-acetoxy-3'-methoxy-4-stilbenecarboxylic acid
CHA: cyclohexanedicarboxylic acid

TABLE 4

| Example | ηinh | Tg °C. | Δn | ne | no | orientation ability | fixing ability |
|---|---|---|---|---|---|---|---|
| 15 | 0.196 | 108.9 | 0.441 | 2.014 | 1.573 | ◉ | ◉ |
| 16 | 0.169 | 104.1 | 0.441 | 2.025 | 1.584 | ◉ | ◉ |
| 17 | 0.129 | 90.4 | 0.448 | 2.019 | 1.571 | ◉ | ◉ |

TABLE 4-continued

| Example | ηinh | Tg °C. | Δn | ne | no | orientation ability | fixing ability |
|---|---|---|---|---|---|---|---|
| 18 | 0.174 | 106.9 | 0.438 | 2.017 | 1.579 | ◉ | ◉ |
| 19 | 0.177 | 83.1 | 0.371 | 1.944 | 1.573 | ◉ | ◉ |
| 20 | 0.133 | 83.3 | 0.349 | 1.932 | 1.583 | ○ | ○ |
| 21 | 0.223 | 89.8 | 0.268 | 1.847 | 1.579 | ◉ | ◉ |
| 22 | 0.162 | 100.8 | 0.186 | 1.778 | 1.592 | ◉ | ◉ |
| 23 | 0.201 | 114.9 | 0.222 | 1.796 | 1.574 | ○ | ○ |
| 24 | 0.125 | 87.0 | 0.373 | 1.960 | 1.587 | ◉ | ◉ |
| 25 | 0.192 | 95.1 | 0.313 | 1.894 | 1.581 | ◉ | ◉ |
| 26 | 0.144 | 92.4 | 0.348 | 1.931 | 1.583 | ◉ | ◉ |
| 27 | 0.141 | 102.5 | 0.281 | 1.872 | 1.591 | ◉ | ◉ |

◉: very excellent.
○: excellent.

Synthesis Example 1

A polymerization vessel equipped with a stirring apparatus, a nitrogen inlet tube and a liquid trap was charged with 8.10 g (77.8 mmol) of (s)-2-methyl-1,4-butanediol (enantiotropic excess, e, e=93%), 14.82 g (50 mmol) of dimethyl 4,4'-stilbenedicarboxylate, 1.50 g (5.56 mmol) of dimethyl 4,4'-biphenylcarboxylate and 1 drop of tetrabutoxy titanium, and the atmosphere in the vessel was replaced by nitrogen. While generated methanol was distilled off under a nitrogen atmosphere, the mixture was reacted at 210° C. for 2 hours. The resulting polyester had a logarithmic viscosity of 0.12, a glass transition temperature of 100° C. and an isotropic transition temperature of 194° C.

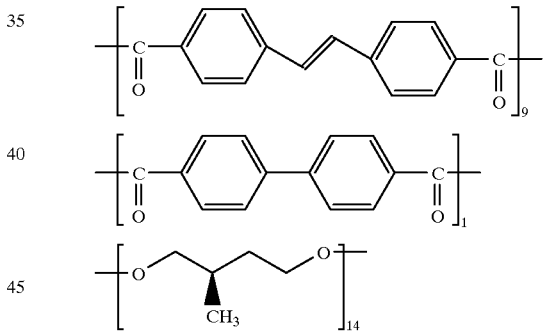

Synthesis Example 2

Reaction was carried out in the same technique as in Synthesis Example 13 except that 6.15 g (59.06 mmol) of (s)-2-methyl-1,4-butanediol (e, e=93%), 10.0 g (33.75 mmol) of dimethyl 4,4'-stilbenedicarboxylate, 1.64 g (8.44 mmol) of dimethyl terephthalate and 1 drop of tetrabutoxy titanium were used. The resulting polyester had a logarithmic viscosity of 0.12, a glass transition temperature of 97° C. and an isotropic transition temperature of 178° C.

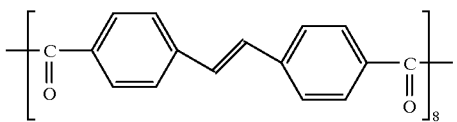

-continued

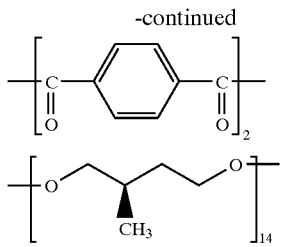

Synthesis Example 3

Reaction was carried out in the same technique as in Synthesis Example 1 except that 8.10 g (77.8 mmol) of (s)-2-methyl-1,4-butanediol (enantiotropic excess, e, e=93%), 13.51 g (50 mmol) of dimethyl 4,4'-biphenyldicarboxylate, 1.08 g (5.56 mmol) of dimethyl terephthalate and 1 drop of tetrabutoxy titanium were used. The resulting polyester had a logarithmic viscosity of 0.11, a glass transition temperature of 60° C. and an isotropic transition temperature of 182° C.

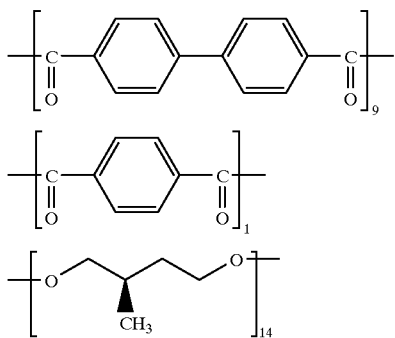

Example 28

A polymerization vessel equipped with a stirring apparatus and a liquid trap was charged with 7.52 g of the polyester obtained in Example 1 and 2.48 g of the polyester obtained in Synthesis Example 1, then the atmosphere in the vessel was replaced by nitrogen, and these were molten-blended at 250° C. for 1 hour under a nitrogen atmosphere. As a result of the observation of the resulting polyester composition under a polarization microscope, said composition indicated a cholesteric liquid crystalline phase over the glass transition temperature and there did not occur transition thereof to a crystalline phase even cooled below the glass transition temperature, so its cholesteric liquid crystalline state could be fixed and it had the ability to form a membrane of uniform thickness.

Then, a 15 wt % tetrachloroethane solution of the resulting composition was prepared. The resulting solution was applied by spin coating onto a rubbing polyimide orientation membrane. Then, the solvent was removed by drying and the membrane was heat-treated at 210° C. for 10 minutes. As a result, a film of said composition was obtained on the rubbing polyimide orientation membrane. The resulting film had a monodomain cholesteric orientation fixed in it and had an uniform film thickness (2.1 $\mu$m).

As a result of the measurement of the zone width of a cholesteric selective reflection wavelength spectrum of said film, the zone width was 117 nm (559 nm). The estimated double refractive index $\Delta n$ at 590 nm was 0.37.

Example 29

7.12 g of the polyester obtained in Example 1 and 2.89 g of the polyester obtained in Synthesis Example 2 were introduced into a reaction vessel and molten-blended at 250° C. for 1 hour under a nitrogen atmosphere. As a result of observation of the resulting composition under a polarization microscope, said composition indicated a cholesteric liquid crystalline phase over the glass transition temperature and there did not occur transition thereof to a crystalline phase even cooled below the glass transition temperature, and the uniform monodomain cholesteric liquid crystalline state could be fixed, and it had the ability to form a membrane of uniform thickness.

Then, a film (film thickness: 2.1 $\mu$m) with the monodomain cholesteric orientation fixed in it was prepared from said composition in the same manner as in Example 28, and as a result of the measurement of the zone width of its cholesteric selective reflection wavelength spectrum, the zone width was 104 nm (498 nm). The estimated double refractive index $\Delta n$ at 590 nm was 0.37.

Example 30

7.62 g of the polyester obtained in Example 1 and 2.38 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 2.1 $\mu$m) with the cholesteric orientation fixed in it was prepared from said composition in the same manner as in Example 28, and as a result of the measurement of the zone width of its cholesteric selective reflection wavelength spectrum, the zone width was 125 nm (599 nm). The estimated double refractive index $\Delta n$ at 590 nm was 0.37.

Example 31

7.59 g of the polyester obtained in Example 1 and 2.41 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 2.1 $\mu$m) with the cholesteric orientation fixed in it was prepared from said composition in the same manner as in Example 28, and as a result of the measurement of the zone width of its cholesteric selective reflection wavelength spectrum, the zone width was 123 nm (590 nm). The estimated double refractive index $\Delta n$ at 590 nm was 0.37.

Example 32

7.12 g of the polyester obtained in Example 9 and 2.89 g of the polyester obtained in Synthesis Example 1 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 1.9 $\mu$m) with the cholesteric orientation fixed in it was prepared from said composition in the same manner as in Example 28, and as a result of the measurement of the zone width of its cholesteric selective reflection wavelength spectrum, the zone width was 112 nm (490 nm). The estimated double refractive index Δn at 590 nm was 0.41.

Example 33

7.62 g of the polyester obtained in Example 9 and 2.38 g of the polyester obtained in Synthesis Example 1 were introduced into a reaction vessel and molten-blended at 250° C. for 1 hour under a nitrogen atmosphere. Said composition could have the uniform monodomain cholesteric orientation fixed in it and had the ability to form a membrane of uniform thickness.

Then, a film (film thickness: 1.9 μm) with the cholesteric orientation fixed in it was prepared from said composition in the same manner as in Example 28, and as a result of the measurement of the zone width of its cholesteric selective reflection wavelength spectrum, the zone width was 135 nm (590 nm). The double refractive index Δn was 0.41 (590 nm).

Example 34

7.00 g of the polyester obtained in Example 10 and 3.00 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 2.1 μm) with the cholesteric orientation fixed in it was prepared from said composition in the same manner as in Example 28, and as a result of the measurement of the zone width of its cholesteric selective reflection wavelength spectrum, the zone width was 132 nm (507 nm). The estimated double refractive index Δn at 590 nm was 0.42.

Example 35

7.42 g of the polyester obtained in Example 10 and 2.58 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 2.1 μm) with the cholesteric orientation fixed in it was prepared from said composition in the same manner as in Example 28, and as a result of the measurement of the zone width of its cholesteric selective reflection wavelength spectrum, the zone width was 138 nm (590 nm). The double refractive index Δn was 0.42 (590 nm).

Example 36

7.21 g of the polyester obtained in Example 5 and 2.79 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 1.9 μm) with the cholesteric orientation fixed in it was prepared from said composition in the same manner as in Example 28, and as a result of the measurement of the zone width of its cholesteric selective reflection wavelength spectrum, the zone width was 117 nm (503 nm). The estimated double refractive index Δn at 590 nm was 0.39.

Example 37

7.72 g of the polyester obtained in Example 5 and 2.28 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 1.9 μm) with the cholesteric orientation fixed in it was prepared from said composition in the same manner as in Example 28, and as a result of the measurement of the zone width of its cholesteric selective reflection wavelength spectrum, the zone width was 136 nm (608 nm). The estimated double refractive index Δn at 590 nm was 0.39.

Example 38

7.49 g of the polyester obtained in Example 5 and 2.51 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 1.9 μm) with the cholesteric orientation fixed in it was prepared from said composition in the same manner as in Example 28, and as a result of the measurement of the zone width of its cholesteric selective reflection wavelength spectrum, the zone width was 129 nm (590 nm). The double refractive index Δn was 0.39 (590 nm).

Example 39

7.70 g of the polyester obtained in Example 8 and 2.30 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 2.1 μm) with the cholesteric orientation fixed in it was prepared from said composition in the same manner as in Example 28, and as a result of the measurement of the zone width of its cholesteric selective reflection wavelength spectrum, the zone width was 137 nm (605 nm). The estimated double refractive index Δn at 590 nm was 0.41.

Example 40

7.51 g of the polyester obtained in Example 8 and 2.49 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 2.1 μm) with the cholesteric orientation fixed in it was prepared from said composition in the same manner as in Example 28, and as a result of the measurement of the zone width of its cholesteric selective reflection wavelength spectrum, the zone width was 135 nm (590 nm). The double refractive index Δn was 0.41 (590 nm).

Example 41

7.50 g of the polyester obtained in Example 2 and 2.50 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 1.9 μm) with the cholesteric orientation fixed in it was prepared from said composition in the same manner as in Example 28, and as a result of the measurement of the zone width of its cholesteric selective reflection wavelength spectrum, the zone width was 129 nm (740 nm). The estimated double refractive index Δn at 590 nm was 0.30.

Example 42

6.86 g of the polyester obtained in Example 2 and 3.13 g of the polyester obtained in Synthesis Example 2 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 1.9 μm) with the cholesteric orientation fixed in it was prepared from said composition in the same manner as in Example 28, and as a result of the measurement of the zone width of its cholesteric selective reflection wavelength spectrum, the zone width was 102 nm (590 nm). The double refractive index Δn was 0.30 (590 nm).

Example 43

8.15 g of the polyester obtained in Example 2 and 1.85 g of the polyester obtained in Synthesis Example 3 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 2.1 μm) with the cholesteric orientation fixed in it was prepared from said composition in the same manner as in Example 28, and as a result of the measurement of the zone width of its cholesteric selective reflection wavelength spectrum, the zone width was 136 nm (740 nm). The estimated double refractive index Δn at 590 nm was 0.32.

Example 44

7.68 g of the polyester obtained in Example 2 and 2.32 g of the polyester obtained in Synthesis Example 3 were introduced into a reaction vessel and molten-blended at 250° C. for 1 hour under a nitrogen atmosphere. The resulting composition could have the uniform monodomain cholesteric orientation fixed in it and had the ability to form a membrane of uniform thickness.

Then, a film (film thickness: 2.1 μm) with the cholesteric orientation fixed in it was prepared from said composition in the same manner as in Example 28, and as a result of the measurement of the zone width of its cholesteric selective reflection wavelength spectrum, the zone width was 108 nm (590 nm). The double refractive index Δn was 0.32 (590 n).

Synthesis Example 4

Reaction was conducted in the same technique as in Example 1 except that 7.28 g (35 mmol) of methylhydroquinone diacetate, 12.62 g (65 mmol) of catechol diacetate and 16.61 g (100 mmol) of terephthalic acid were used. The resulting polyester had a logarithmic viscosity 0.15 and a glass transition temperature of 108° C.

As a result of observation under a polarization microscope, the resulting polyester indicated a nematic liquid crystalline phase over the glass transition temperature and there did not occur transition thereof to a crystalline phase even cooled below the glass transition temperature, and its nematic liquid crystalline state could be fixed. As a result of measurement of its double refractive index, the double refractive index of this polyester where the liquid crystalline state was fixed was 0.20.

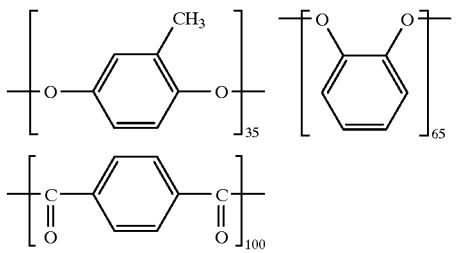

Comparative Example 2

8.0 g of the polyester obtained in Synthesis Example 4 and 2.0 g of the polyester obtained in Synthesis Example 3 were introduced into a reaction vessel and molten-blended at 250° C. for 1 hour under a nitrogen atmosphere. A film with the cholesteric orientation fixed in it was prepared, and as a result of the measurement of the zone width of its cholesteric selective reflection wavelength spectrum, the zone width where the liquid crystalline state was fixed was 80 nm (585 nm). The estimated double refractive index Δn at 590 nm was 0.22.

Synthesis Example 5

A polymerization vessel equipped with a stirring apparatus, a nitrogen inlet tube and a liquid trap was charged with 6.15 g (59.06 mmol) of (s)-2-methyl-1,4-butanediol (enantiotropic excess, e, e=93%), 10.0 g (33.75 mmol) of dimethyl 4,4'-stilbenedicarboxylate, 1.64 g (8.44 mmol) of dimethyl terephthalate and 1 drop of tetrabutoxy titanium, and the atmosphere in the vessel was replaced by nitrogen. While generated methanol was distilled off under a nitrogen atmosphere, the mixture was reacted at 210° C. for 2 hours. The resulting polyester had a logarithmic viscosity of 0.12, a glass transition temperature of 97° C. and an isotropic transition temperature of 178° C.

Example 45

A polymerization vessel equipped with a stirring apparatus and a liquid trap was charged with 7.00 g of the polyester obtained in Example 14 and 3.00 g of the polyester obtained in Synthesis Example 5, then the atmosphere in the vessel was replaced by nitrogen, and these were molten-blended at 250° C. for 1 hour under a nitrogen atmosphere. As a result of observation of the resulting polyester under a polarization microscope, this polymer indicated a cholesteric liquid crystalline phase over the glass transition temperature and there did not occur transition thereof to a crystalline phase even cooled below the glass transition temperature, and its cholesteric liquid crystalline state could be fixed. As a result of measurement of the cholesteric selective reflection zone, the band width of this polyester where the liquid crystalline state was fixed was 132 nm (507 nm), Δn was 0.42 and the helical pitch was 0.30 μm.

Example 46

A reaction vessel was charged with 7.42 g of the polyester obtained in Example 14 and 2.58 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 138 nm (590 nm), $\Delta n$ was 0.42 and the helical pitch was 0.35 $\mu$m.

Example 47

A reaction vessel was charged with 7.12 g of the polyester obtained in Example 15 and 2.89 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 112 nm (490 nm), $\Delta n$ was 0.41 and the helical pitch was 0.29 $\mu$m.

Example 48

A reaction vessel was charged with 7.62 g of the polyester obtained in Example 15 and 2.38 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 135 nm (590 nm), $\Delta n$ was 0.41 and the helical pitch was 0.35 $\mu$m.

Example 49

A reaction vessel was charged with 7.70 g of the polyester obtained in Example 17 and 2.30 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 137 nm (605 nm), $\Delta n$ was 0.41 and the helical pitch was 0.36 $\mu$m.

Example 50

A reaction vessel was charged with 7.51 g of the polyester obtained in Example 17 and 2.49 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 135 nm (590 nm), $\Delta n$ was 0.41 and the helical pitch was 0.35 $\mu$m.

Example 51

A reaction vessel was charged with 7.12 g of the polyester obtained in Example 18 and 2.79 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 117 nm (503 nm), n$\Delta$ was 0.39 and the helical pitch was 0.30 $\mu$m.

Example 52

A reaction vessel was charged with 7.72 g of the polyester obtained in Example 18 and 2.28 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 136 nm (608 nm), $\Delta n$ was 0.39 and the helical pitch was 0.36 $\mu$m.

Example 53

A reaction vessel was charged with 7.49 g of the polyester obtained in Example 18 and 2.51 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 129 nm (590 nm), $\Delta n$ was 0.39 and the helical pitch was 0.35 $\mu$m.

Example 54

A reaction vessel was charged with 7.50 g of the polyester obtained in Example 20 and 2.50 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 111 nm (590 nm), $\Delta n$ was 0.33 and the helical pitch was 0.34 $\mu$m.

Example 55

A reaction vessel was charged with 7.50 g of the polyester obtained in Example 24 and 2.50 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 117 nm (590 nm), $\Delta n$ was 0.35 and the helical pitch was 0.33 $\mu$m.

Example 56

A reaction vessel was charged with 7.50 g of the polyester obtained in Example 25 and 2.50 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 102 nm (590 nm), $\Delta n$ was 0.30 and the helical pitch was 0.34 $\mu$m.

Example 57

A reaction vessel was charged with 7.50 g of the polyester obtained in Example 27 and 2.50 g of the polyester obtained in Synthesis Example 5, and these were molten-blended at 250° C. for 1 hour under a nitrogen atmosphere. As a result of measurement of the cholesteric selective reflection zone, the band width of this polyester where the liquid crystalline state was fixed was 111 nm (590 nm), $\Delta n$ was 0.33 and the helical pitch was 0.34 $\mu$m.

BRIEF DESCRIPTION OF THE DRAWINGS

FIG. 11 shows an NMR spectrum of the optically active liquid crystalline polyester in Synthesis Example 2.

Figure 1:
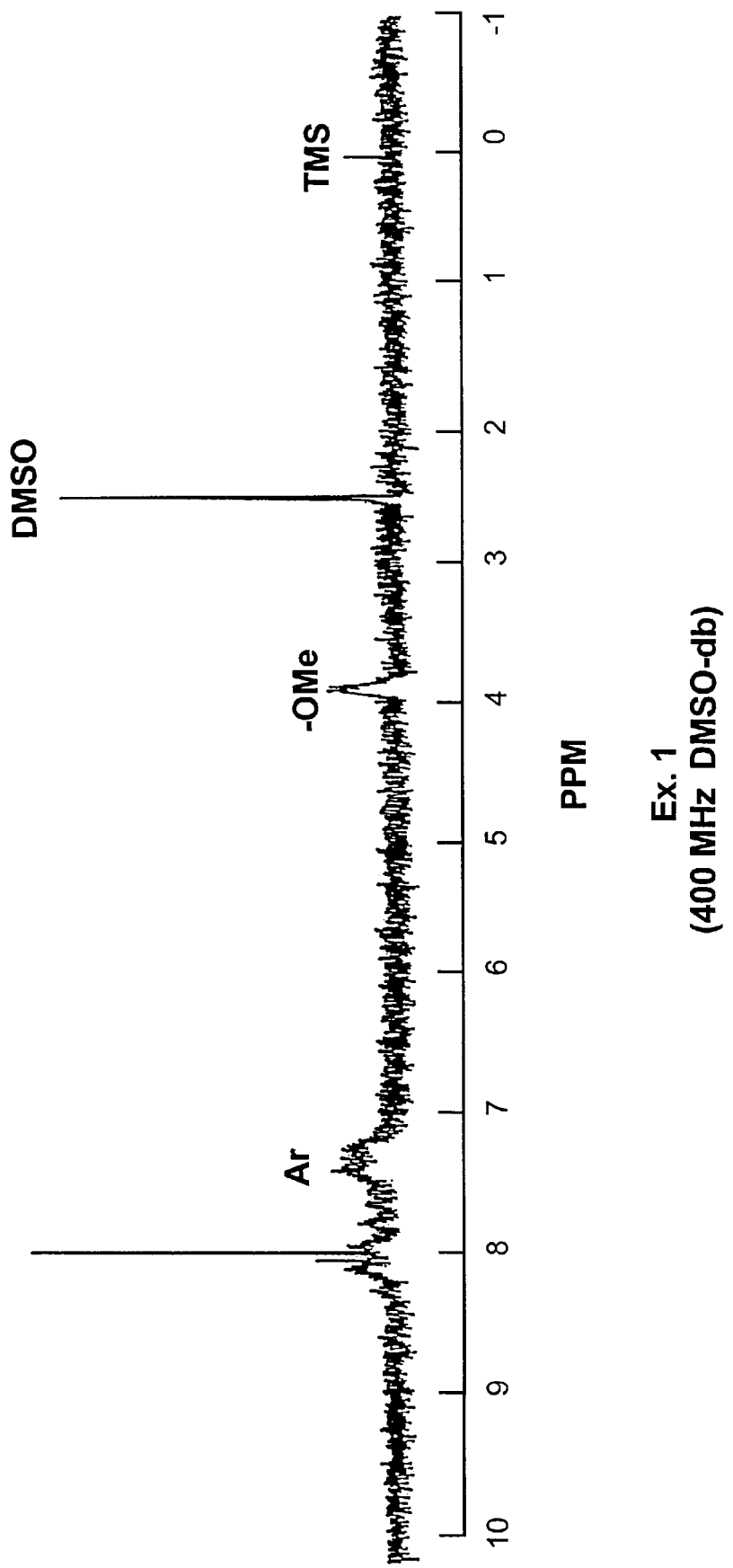
FIG. 1 shows an NMR spectrum of the liquid crystalline polyester in Example 1.
Figure 2:
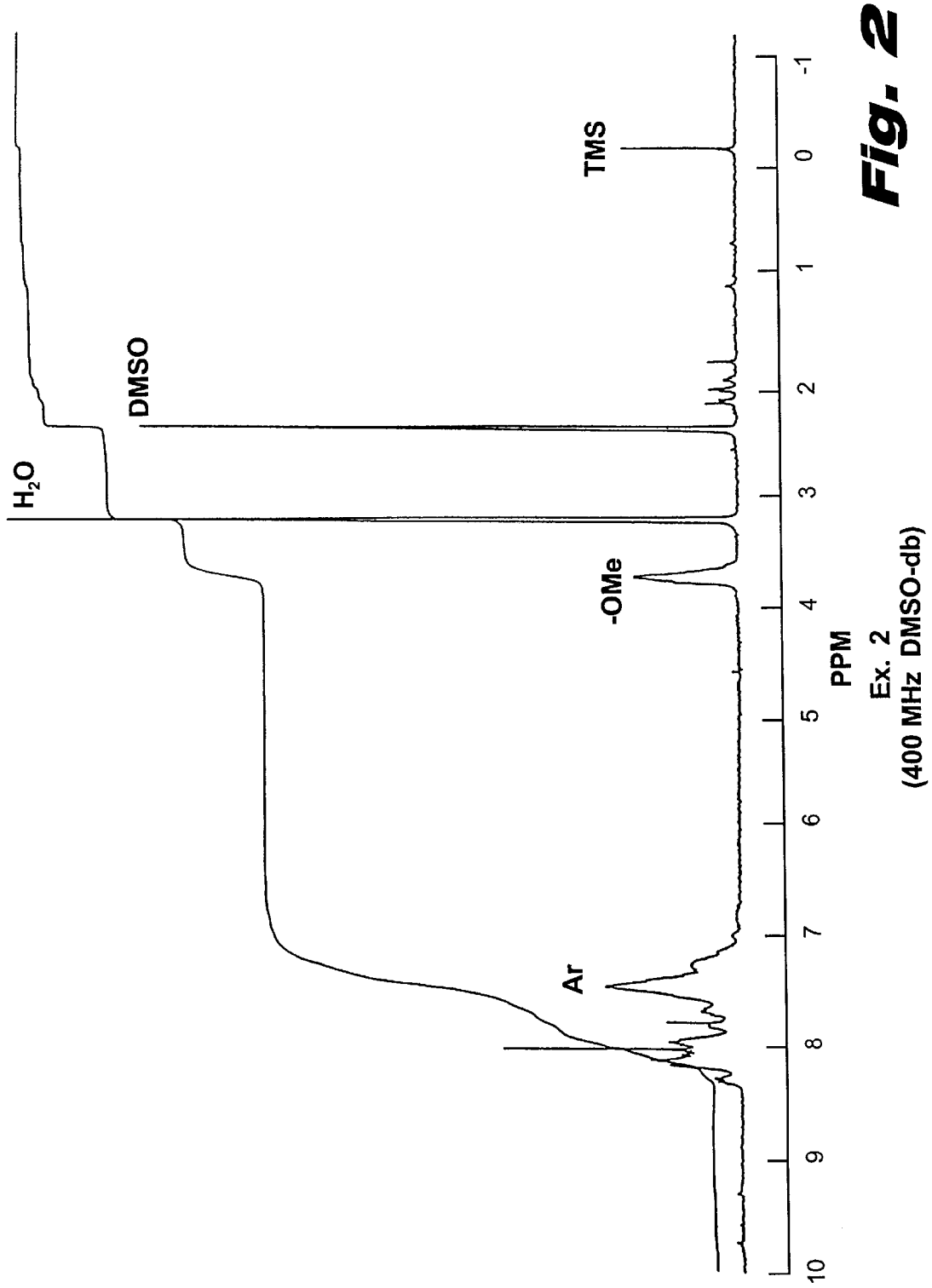
FIG. 2 shows an NMR spectrum of the liquid crystalline polyester in Example 2.
Figure 3:
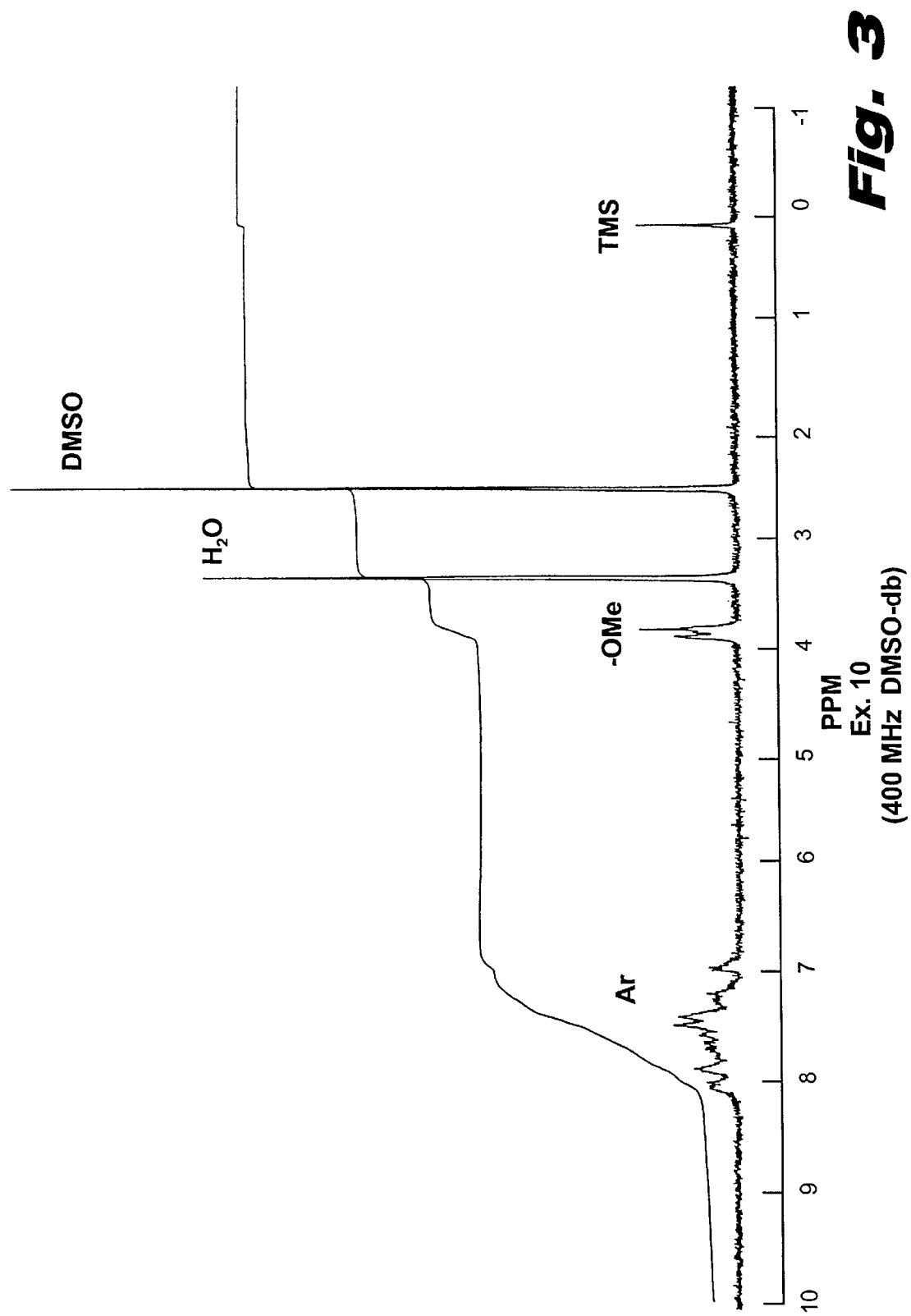
FIG. 3 shows an NMR spectrum of the liquid crystalline polyester in Example 10.
Figure 4:
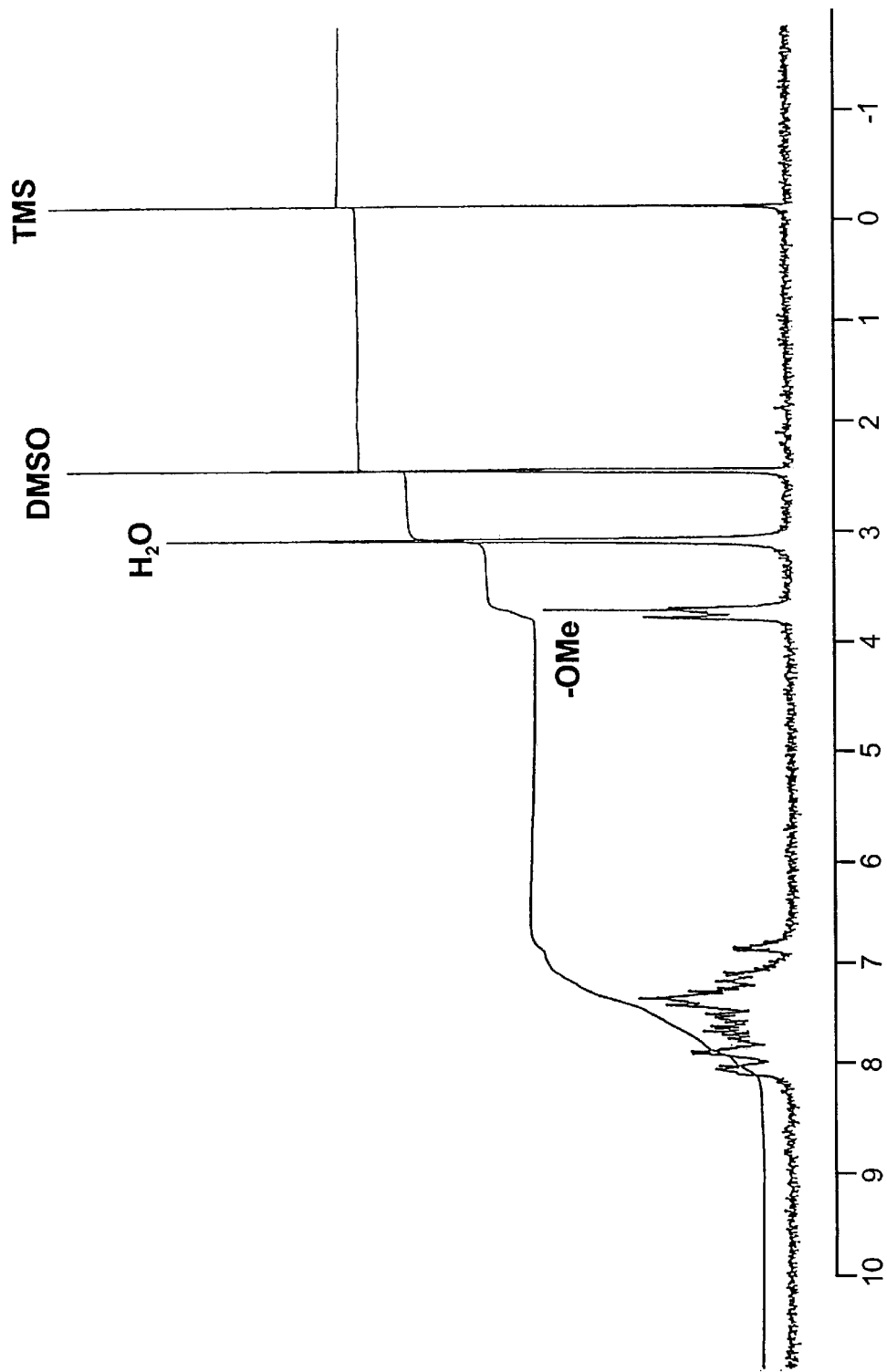
FIG. 4 shows an NMR spectrum of the polyester in Example 14.
Figure 5:
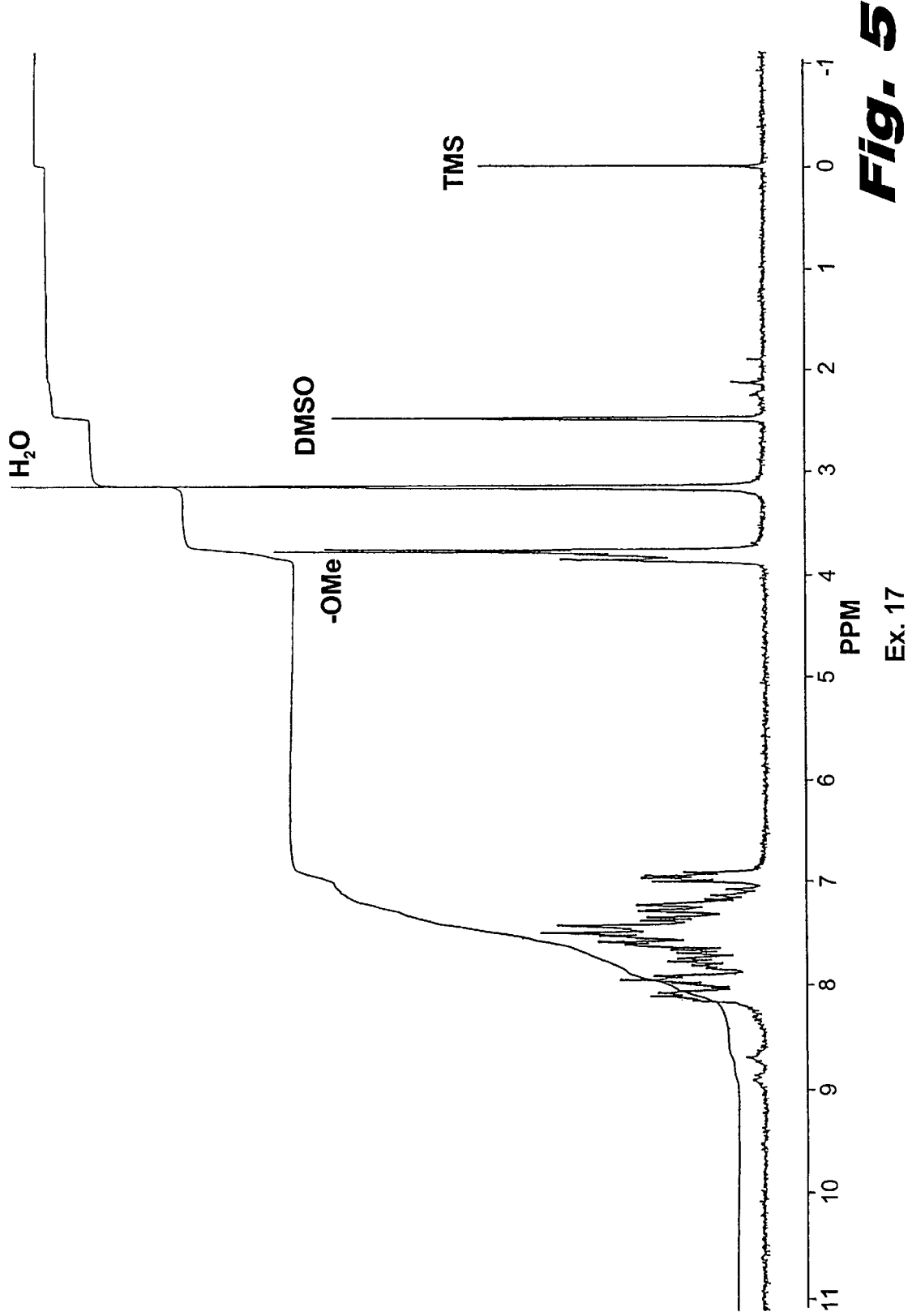
FIG. 5 shows an NMR spectrum of the polyester in Example 17.
Figure 6:
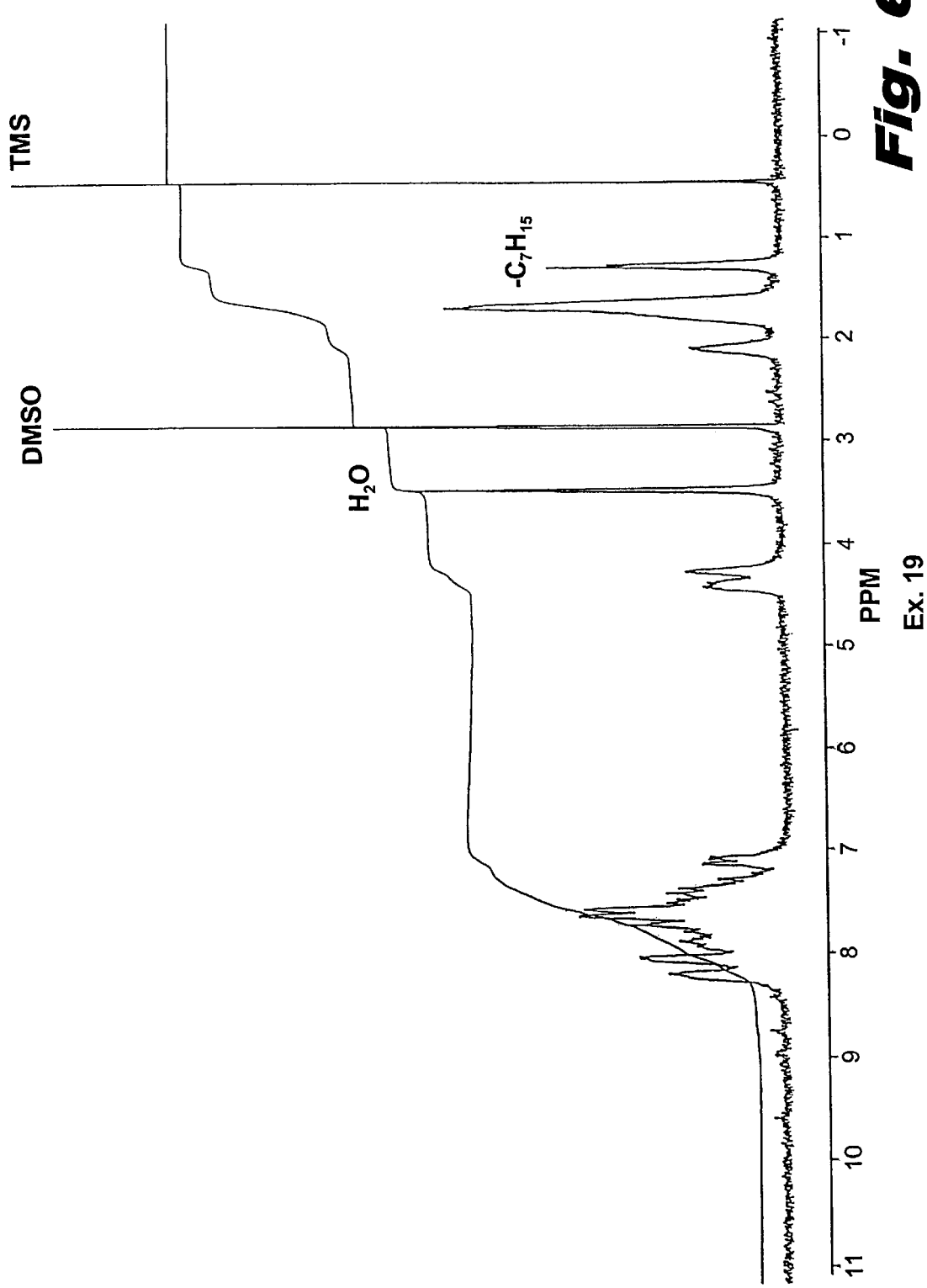
FIG. 6 shows an NMR spectrum of the polyester in Example 19.
Figure 7:
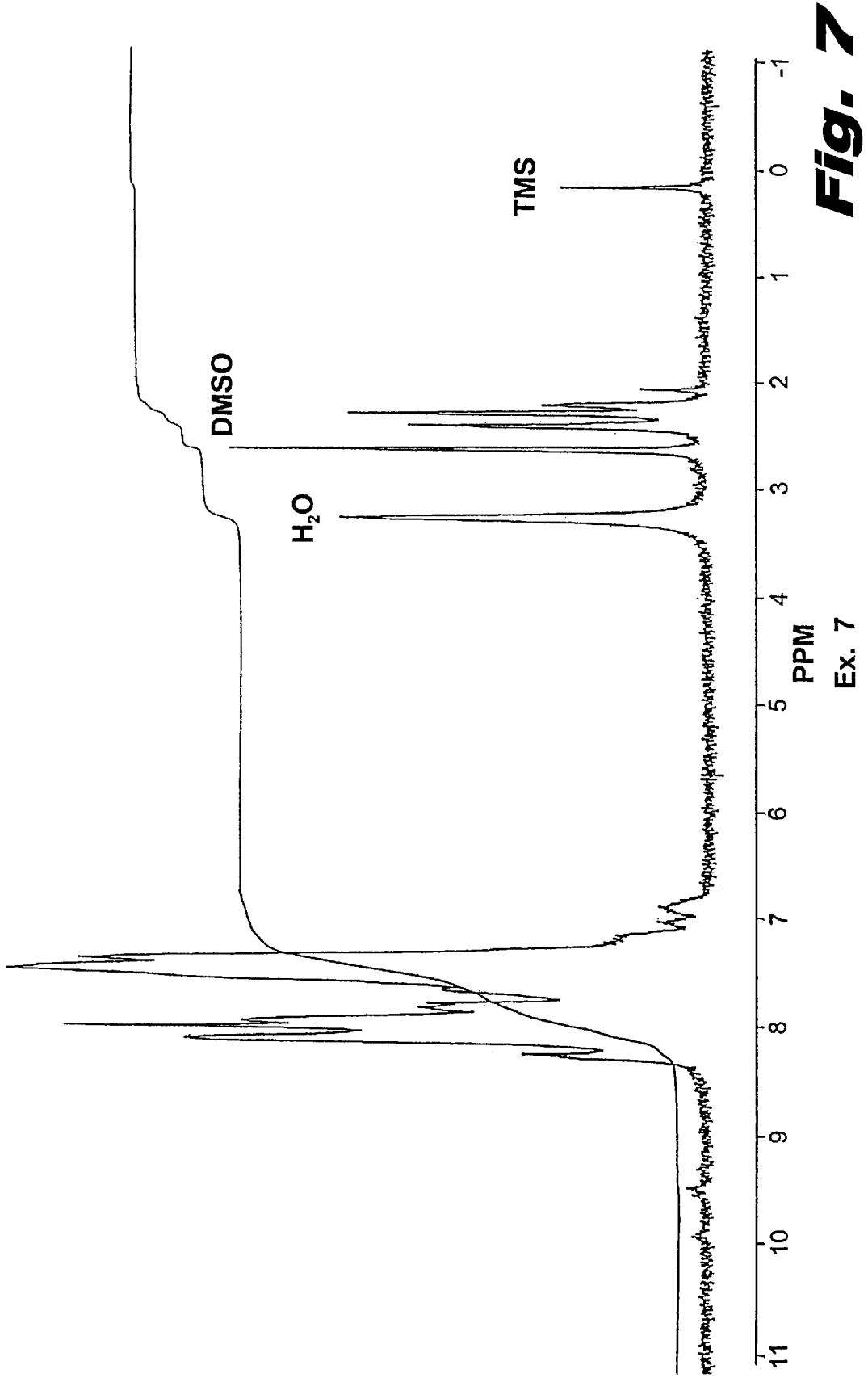
FIG. 7 shows an NMR spectrum of the polyester in Example 20.
Figure 8:
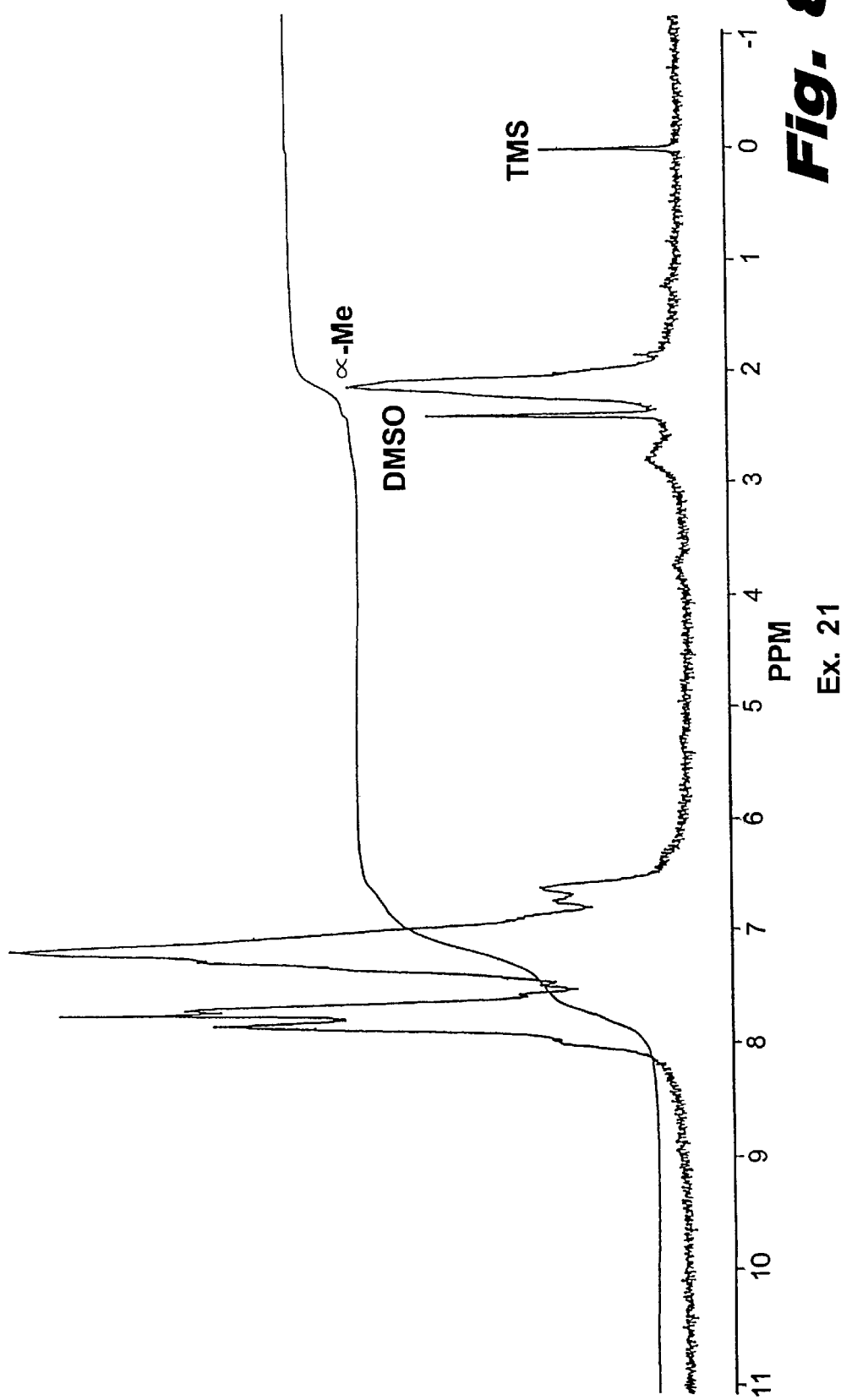
FIG. 8 shows an NMR spectrum of the polyester in Example 21.
Figure 9:
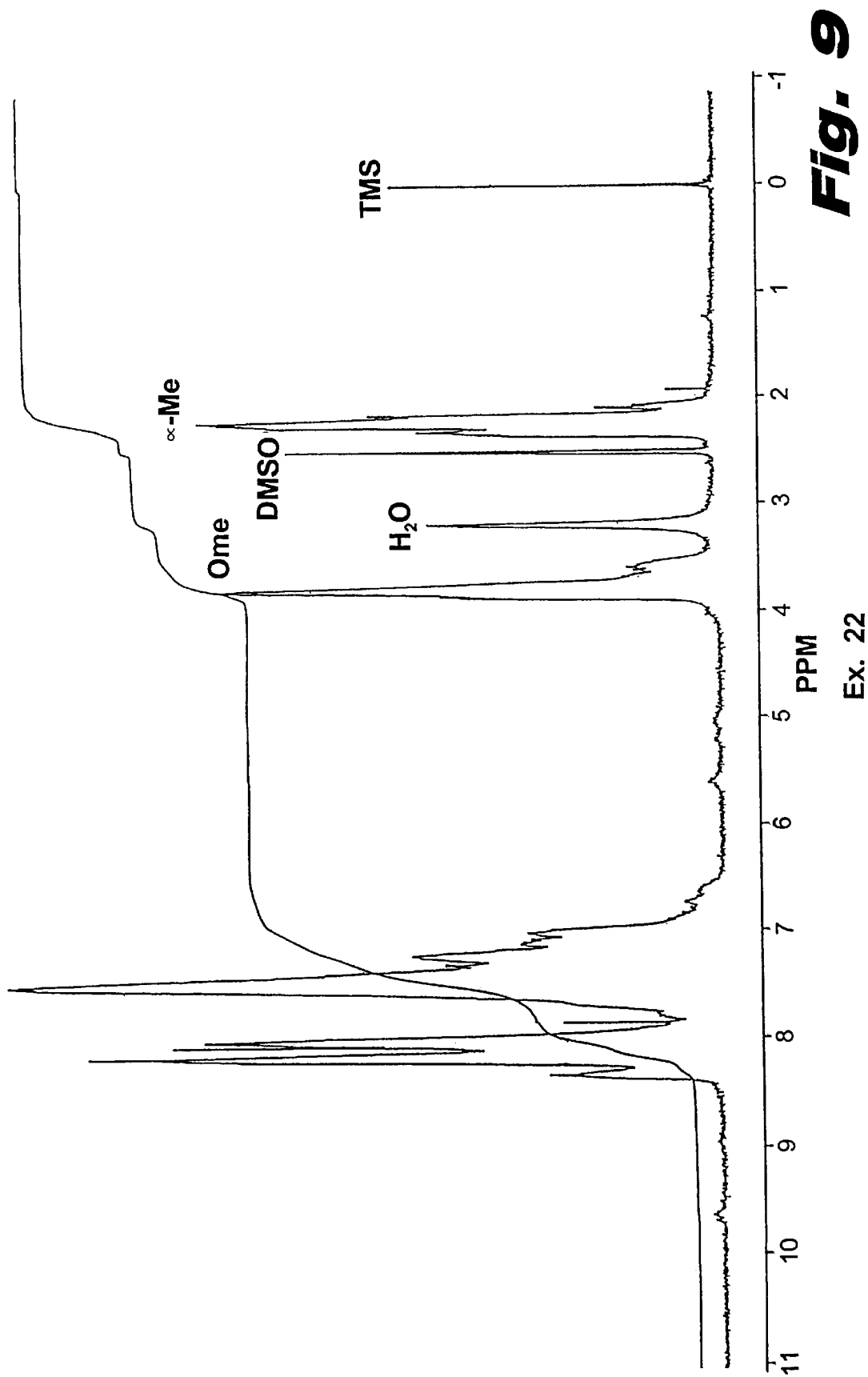
FIG. 9 shows an NMR spectrum of the polyester in Example 22.
Figure 10:
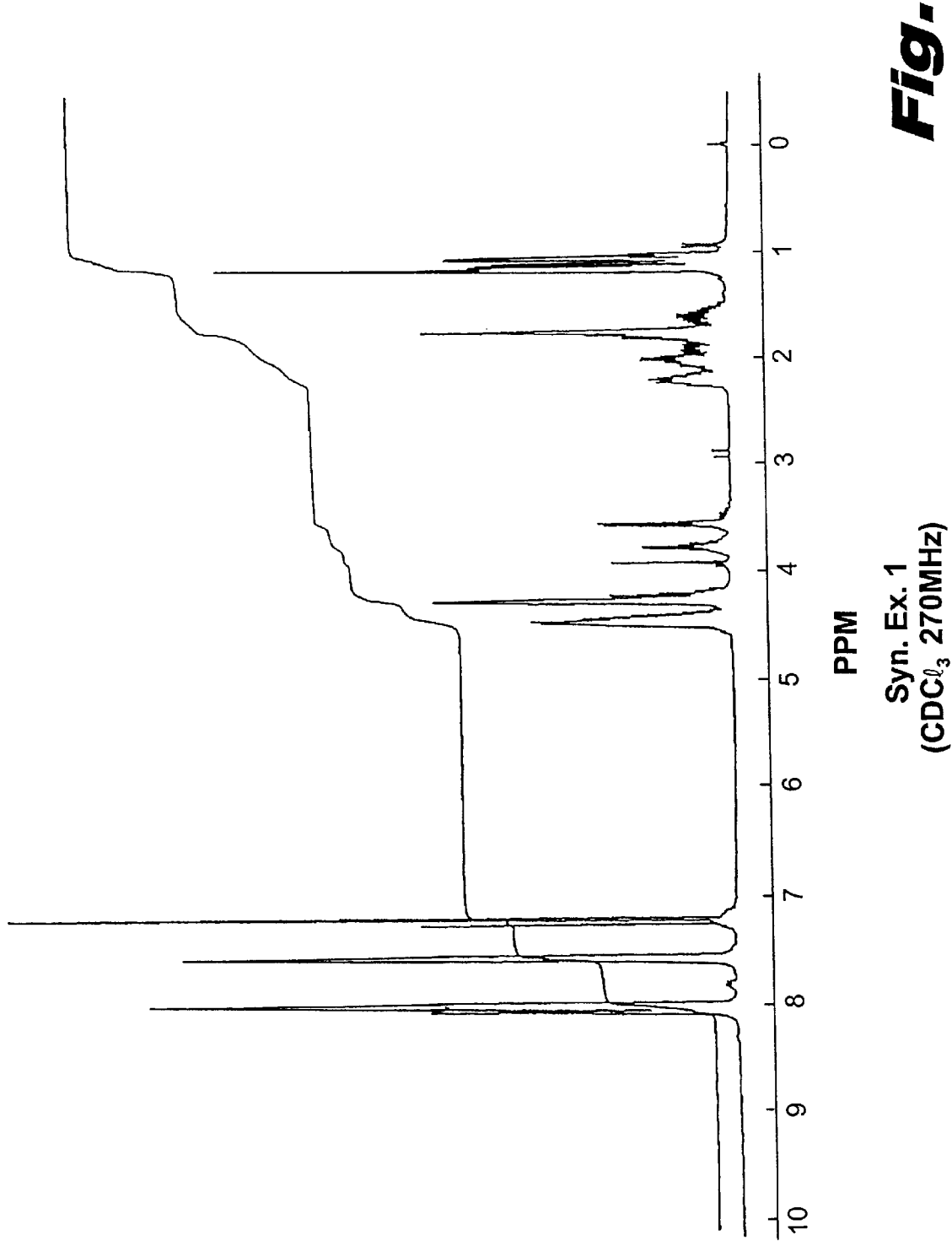
FIG. 10 shows an NMR spectrum of the optically active liquid crystalline polyester in Synthesis Example 1.

What is claimed is:

1. Liquid crystalline polyesters having the following structural units (A), (B) and (C) as essential structural units and at least one structural unit selected from the structural units (D), (E) and (F) as arbitrary structural units and having a logarithmic viscosity of 0.05 to 0.5 determined at a concentration of 0.5 g/dl at a temperature of 30° C. in a mixed solvent of phenol/tetrachloroethane (ratio of 60/40 by weight). 20 to 80 mol % Compound (A):

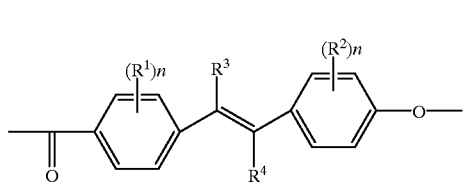

wherein $R^1$ and $R^2$ independently represent H, F, Cl, Br or C1 C5 alkyl groups or alkoxy groups; $R^3$ or $R^4$ represent H, F, Br or C1 to C5 alkyl groups; and n is 1 or 2. 10 to 40 mol % Compound (B):

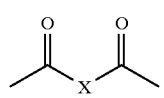

wherein X is at least one structural unit selected from the group consisting of:

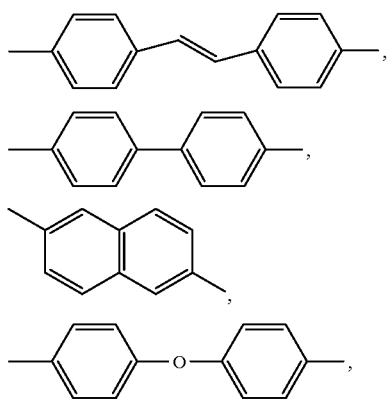

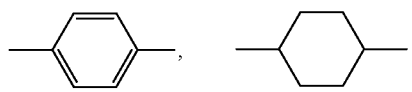

and

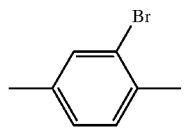

10 to 40 mol % Compound (C):

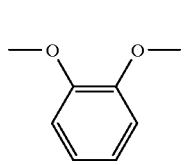

0 to 10 mol % Compound (D):

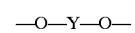

wherein Y is at least one structural unit selected from the group consisting of:

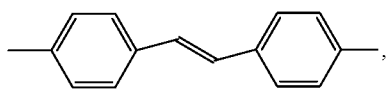

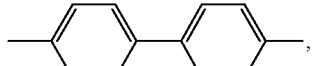

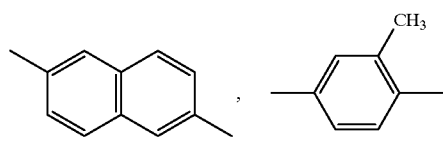

and

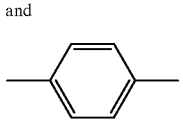

0 to 20 mol % Compound (E):

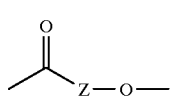

wherein Z is at least one structural unit selected from the group consisting of:

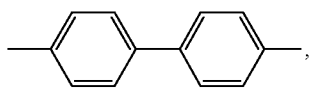

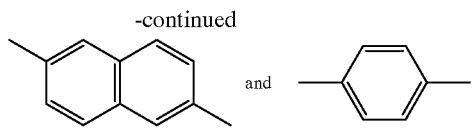 and 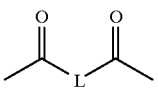

0 to 30 mol % Component (F):

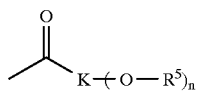 (F)

wherein $R^5$ represents C1 to C20 straight-chain or branched chain alkyl groups; n is 1 or 2; and K is at least one structural unit selected from the group consisting of:

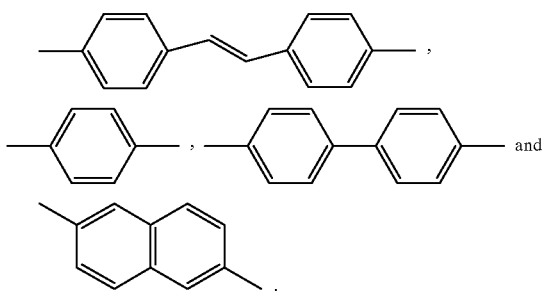

2. Liquid crystalline polyesters according to claim 1 which exhibit a liquid crystalline phase at the time of fusion and can fix said liquid crystalline phase by cooling below the liquid crystal transition temperature.

3. A liquid crystalline polyester composition comprising 50 to 99.5 weight-% liquid crystalline polyesters (component I) described in claim 1 and 0.5 to 50 weight-% optically active liquid crystalline polyesters (component II) consisting of the following structural units (G) and (H) and having a logarithmic viscosity of 0.05 to 0.5 determined at a concentration of 0.5 g/dl at a temperature of 30° C. in a mixed solvent of phenol/tetrachloroethane (ratio of 60/40 by weight). 30 to 60 mol % Compound (G):

(G)

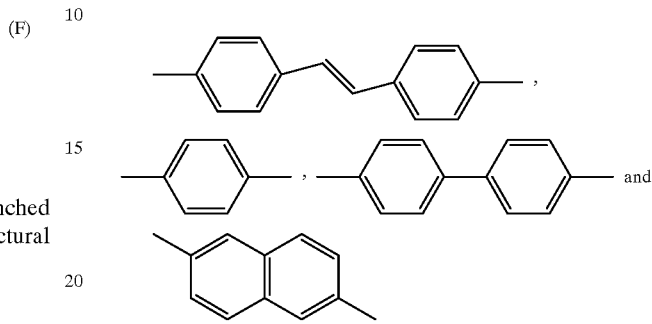

wherein L is at least one structural unit selected from the group consisting of:

40 to 70 mol % Compound (H):

wherein M represents a C3 to C12 optically active divalent aliphatic group containing at least one asymmetric carbon.

4. A liquid crystalline polyester composition according to claim 3 which exhibits a liquid crystalline phase at the time of fusion and can have cholesteric orientation fixed in said liquid crystalline phase by cooling below the liquid crystal transition temperature.

5. An optical film formed from the liquid crystalline polyesters described in any of claims 1 to 4 or the composition in claim 3.

6. An optical film according to claim 5 wherein the double reflective index at a wavelength of 590 nm is 0.3 or more.

7. An optical film according to claim 5 wherein the zone width of the cholesteric selective reflection spectrum at a wavelength of 590 nm is 100 nm or more.

8. An optical film according to claim 5 wherein the double reflective index at a wavelength of 590 nm is 0.3 or more and the zone width of the cholesteric selective reflection spectrum at a wavelength of 590 nm is 100 nm or more.

* * * * *

UNITED STATES PATENT AND TRADEMARK OFFICE
CERTIFICATE OF CORRECTION

PATENT NO.   : 5,989,758
DATED        : November 23, 1999
INVENTOR(S)  : S. Komatsu It is certified that error appears in the above-identified patent and that said Letters Patent is hereby corrected as shown below:

<u>Column 30,</u>
Line 57, insert

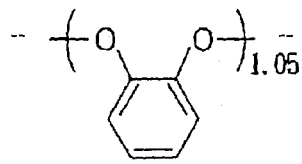

Signed and Sealed this

First Day of October, 2002

*Attest:*

*Attesting Officer*

JAMES E. ROGAN
*Director of the United States Patent and Trademark Office*